(12) United States Patent
Ergun et al.

(10) Patent No.: US 11,771,216 B2
(45) Date of Patent: Oct. 3, 2023

(54) WORKSTATION INCLUDING SIMPLIFIED LEG ATTACHMENT

(71) Applicant: Ergotron, Inc., St. Paul, MN (US)

(72) Inventors: Mustafa Ergun, Eden Prairie, MN (US); Shaun Christopher Lindblad, Inver Grove Heights, MN (US); Michael P. Barros, Minnetonka, MN (US); Michael Anthony Apolloni, Edina, MN (US); Nicholas Robert Swartz, Minneapolis, MN (US); Robert William Fluhrer, Prior Lake, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 17/630,749

(22) PCT Filed: Aug. 27, 2020

(86) PCT No.: PCT/US2020/048205
§ 371 (c)(1),
(2) Date: Jan. 27, 2022

(87) PCT Pub. No.: WO2021/041680
PCT Pub. Date: Mar. 4, 2021

(65) Prior Publication Data
US 2022/0257003 A1    Aug. 18, 2022

Related U.S. Application Data

(60) Provisional application No. 62/892,318, filed on Aug. 27, 2019.

(51) Int. Cl.
*A47B 13/02* (2006.01)
*A47B 3/06* (2006.01)
(Continued)

(52) U.S. Cl.
CPC ............. *A47B 13/021* (2013.01); *A47B 3/06* (2013.01); *A47B 9/20* (2013.01); *F16B 12/52* (2013.01);
(Continued)

(58) Field of Classification Search
CPC .......... A47B 13/021; A47B 9/20; A47B 3/06; A47B 2200/002; B16B 12/52
See application file for complete search history.

(56) References Cited

U.S. PATENT DOCUMENTS

| 3,403,641 A | 10/1968 | Baker |
| 4,811,508 A | 3/1989 | Weyel et al. |

(Continued)

FOREIGN PATENT DOCUMENTS

| CA | 2778652 A1 | 12/2012 |
| CN | 107981540 A | 5/2018 |

(Continued)

OTHER PUBLICATIONS

"International Application Serial No. PCT/US2020/048205, International Search Report dated Nov. 23, 2020", 2 pgs.

(Continued)

*Primary Examiner* — Daniel J Rohrhoff
(74) *Attorney, Agent, or Firm* — Schwegman Lundberg & Woessner, P.A.

(57) ABSTRACT

A coupling system between the frame and the leg assembly of a workstation is described. The coupling system can be configured to selectively attach and detach the leg assembly from the frame. The leg assembly can include an adjustment mechanism. The adjustment mechanism, can be configured to adjust the length of the leg. The leg assembly can include a leg coupling feature and the frame can have a frame coupling feature. The leg coupling feature can be configured to engage with the frame coupling feature, for instance to (Continued)

attach the leg to the frame. The workstation can include a latch configured to engage with the leg assembly. Engagement of the latch with the leg assembly can secure a position of the leg with respect to the frame.

23 Claims, 15 Drawing Sheets

(51) Int. Cl.
*A47B 9/20* (2006.01)
*F16B 12/52* (2006.01)

(52) U.S. Cl.
CPC . *A47B 2200/002* (2013.01); *A47B 2200/0046* (2013.01)

(56) References Cited

U.S. PATENT DOCUMENTS

| | | | |
|---|---|---|---|
| 5,026,010 | A | 6/1991 | Camarota |
| 8,967,054 | B2 | 3/2015 | Henriott et al. |
| 10,004,326 | B2 | 6/2018 | Randlov et al. |
| 2012/0304900 | A1 | 12/2012 | Henriott et al. |
| 2017/0135466 | A1 | 5/2017 | Randlov |
| 2017/0238697 | A1* | 8/2017 | Randløv ............... A47B 13/021 |
| 2019/0029413 | A1* | 1/2019 | Patton ..................... A47B 3/06 |
| 2019/0098997 | A1 | 4/2019 | Zhang |
| 2020/0359785 | A1* | 11/2020 | Lu ............................ A47B 9/00 |
| 2021/0052064 | A1* | 2/2021 | Miller ..................... F16B 12/42 |
| 2022/0273095 | A1* | 9/2022 | Nonnenmacher .... A47B 13/003 |

FOREIGN PATENT DOCUMENTS

| | | |
|---|---|---|
| CN | 114667087 A | 6/2022 |
| DE | 102008010669 A1 | 8/2009 |
| DE | 202011003743 U1 | 5/2011 |
| DE | 112020004093 T5 | 7/2022 |
| EP | 2160958 B1 | 6/2016 |
| EP | 2926688 B1 | 2/2017 |
| EP | 3257401 A1 | 12/2017 |
| EP | 3440958 A1 | 2/2019 |
| FR | 2575794 A1 | 7/1986 |
| GB | 2552970 A | 2/2018 |
| WO | WO-2015180723 A1 | 12/2015 |
| WO | WO-2018093324 A1 | 5/2018 |
| WO | WO-2021041680 A1 | 3/2021 |

OTHER PUBLICATIONS

"International Application Serial No. PCT/US2020/048205, Written Opinion dated Nov. 23, 2020", 11 pgs.
"Chinese Application Serial No. 202080060665.5, Voluntary Amendment filed Jul. 19, 2022", 7 pgs.
"International Application Serial No. PCT/US2020/048205, International Preliminary Report on Patentability dated Mar. 10, 2022", 13 pgs.

* cited by examiner

WORKSTATION INCLUDING SIMPLIFIED LEG ATTACHMENT

CLAIM OF PRIORITY

This patent application is a National Stage of PCT Application Serial Number PCT/US2020/048205, entitled "WORKSTATION INCLUDING SIMPLIFIED LEG ATTACHMENT," filed on Aug. 27, 2020, and published as WO 2021/041681 A1 on Mar. 4, 2021, which claims the benefit of priority of Ergun, et al. U.S. Provisional Patent Application Ser. No. 62/892,318, entitled "WORKSTATION INCLUDING SIMPLIFIED LEG ATTACHMENT," filed on Aug. 27, 2019, which are hereby incorporated by reference herein in their entirety.

TECHNICAL FIELD

This document pertains generally, but not by way of limitation, to workstations, for instance a workstation that includes an adjustable-height work surface.

BACKGROUND

A workstation can include a frame and a work surface. At least one leg can support the frame and the work surface, for instance when the leg is attached to the frame. The leg can be detached from the frame, for instance to ease movement (e.g., carrying, shipping, or the like) of the workstation. In an example, the leg can be detached from the workstation when the workstation is moved from a first room to a second room.

BRIEF DESCRIPTION OF THE DRAWINGS

The following drawings are illustrative of particular embodiments of the present invention and therefore do not limit the scope of the invention. The drawings are not to scale and are intended for use in conjunction with the explanations in the following detailed description. Embodiments of the present invention will hereinafter be described in conjunction with the appended drawings. The drawings illustrate generally, by way of example, but not by way of limitation, various embodiments discussed in the present document.

OVERVIEW

This disclosure is directed to attachment of legs to, and detachment of the legs from, a workstation. The workstation can include a height-adjustable work surface. The workstation can further include a frame configured to couple with the height adjustable work surface. A leg assembly can be configured to selectively attach to and detach from the frame.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
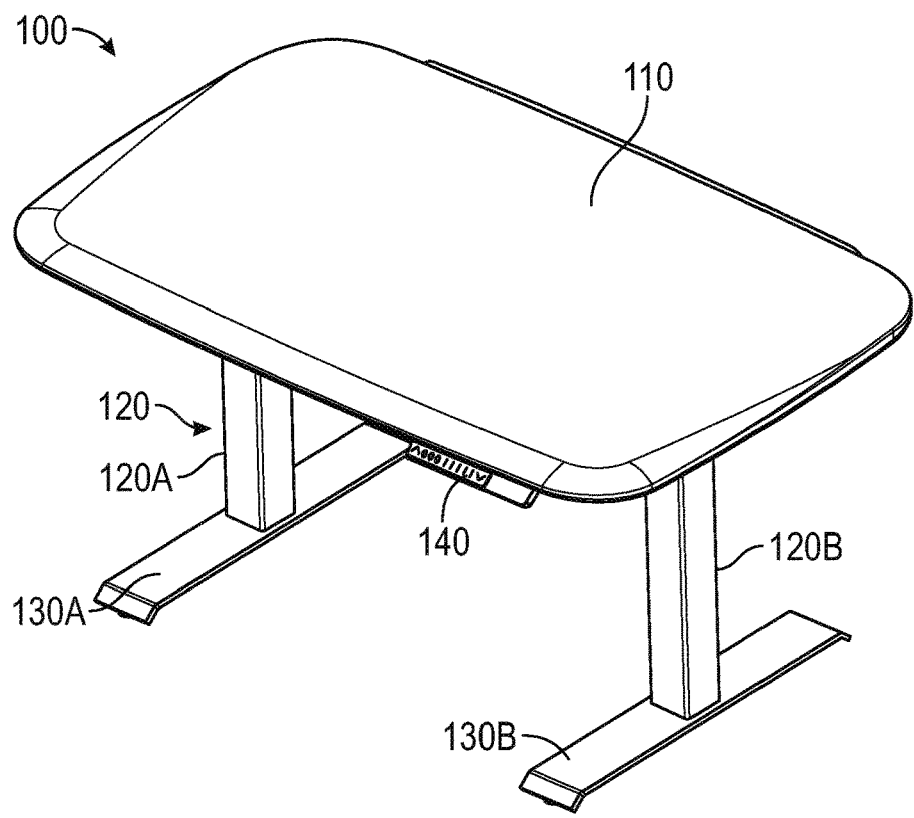
FIG. 1 illustrates a perspective view of a first example of a workstation, according to an embodiment of the present subject matter.

FIG. 1 illustrates a perspective view of a first example of a workstation 100, according to an embodiment of the present subject matter. The workstation 100 can include a work surface 110. A leg assembly 120 can be selectively coupled to the work surface 110. Optionally, a foot assembly 130 can be coupled to the leg assembly 120.

The work surface 110 can be a planar surface, and the work surface 110 can be sized and shaped to allow a user to perform one or more tasks upon the work surface 110. For instance, a computer can be located on the work surface 110. A user can interact with the computer while the computer is located on the work surface 110.

In some examples, the height of the work surface 110 is adjustable. For example, a first leg 120A and a second leg 120B can be coupled to the work surface 110, and the legs 120A, 120B can have a variable length. For instance, the legs 120A, 120B can telescope, and the telescoping of the legs 120A, 120B can vary the height of the work surface 110. A user can manipulate the control panel 140 to adjust the height of the work surface 110.

Figure 2:
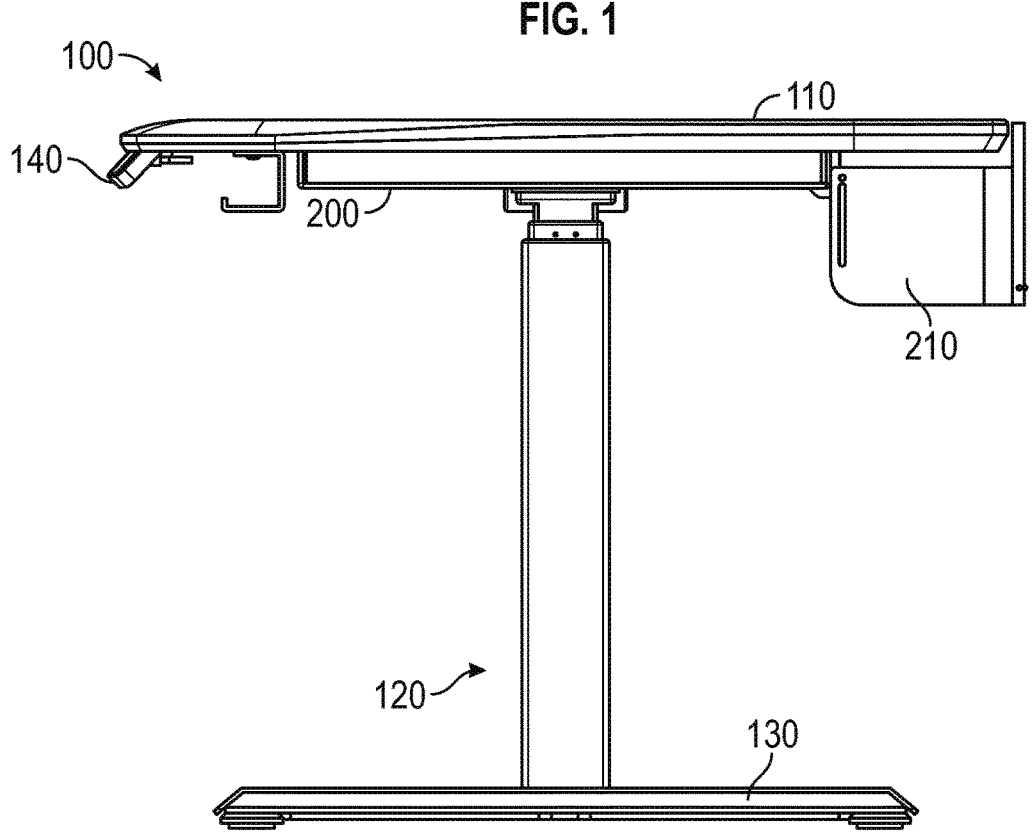
FIG. 2 illustrates a side view of the workstation of FIG. 1, according to an embodiment of the present subject matter.

FIG. 2 illustrates a side view of the workstation 100 of FIG. 1. The workstation 100 can include a frame 200, and the frame 200 can support the work surface 110. For example, the work surface 110 can be coupled to the frame 200. The leg assembly 120 can be coupled to the frame 200, and the foot assembly 130 can be coupled to the leg assembly 120. Accordingly, the work surface 110 is supported by the frame 200, the leg assembly 120, and the foot assembly 130.

The workstation 100 can include a cord management channel 210. In an example, the cord management channel 210 can be coupled to an underside of the work surface 110, and can obscure or retain cords (e.g., power cables, networking cables, display cables, or the like), and help a user Organize cords for objects (e.g., a computer, a display, a television, or the like) supported by the workstation 100.

Figure 3:
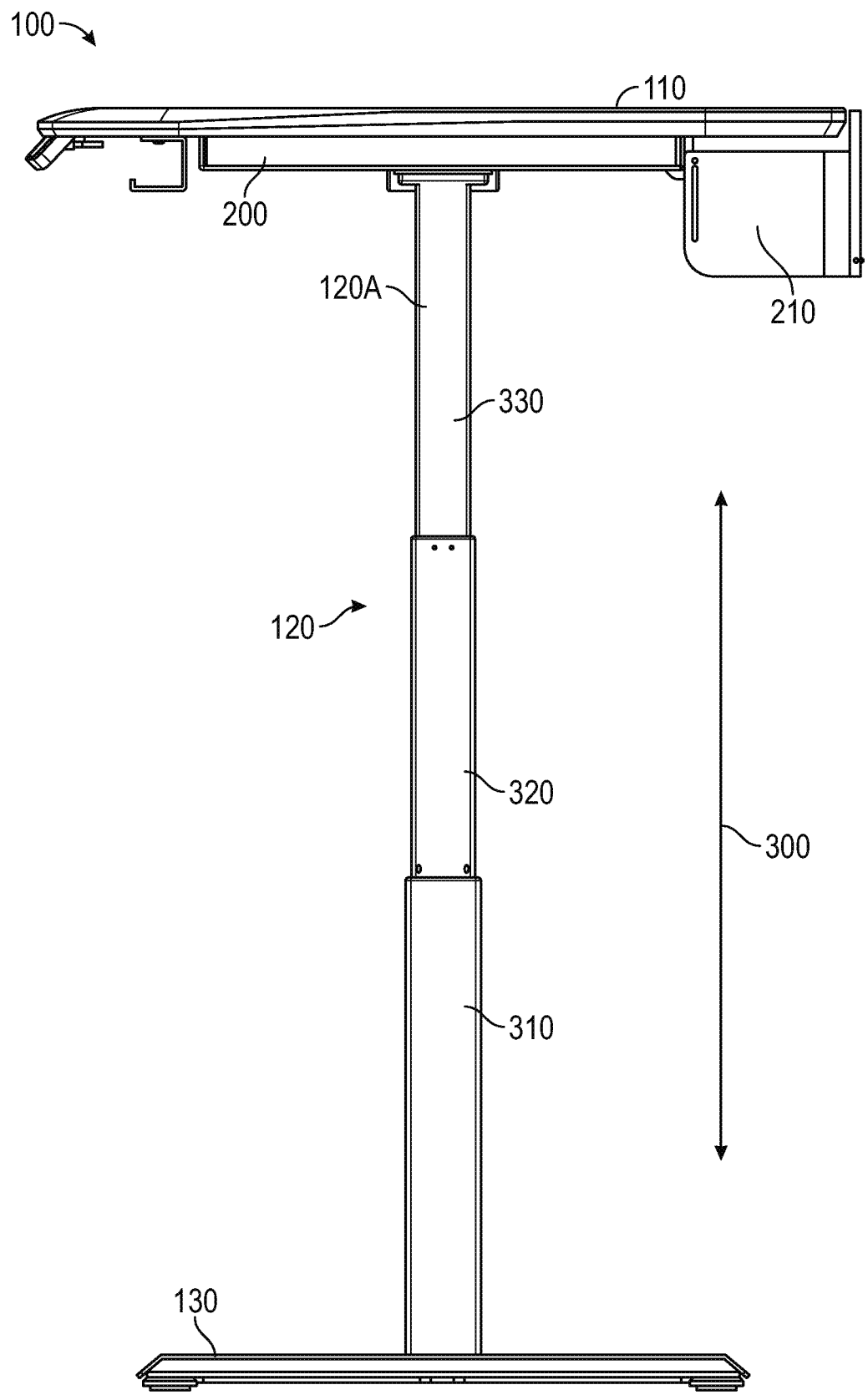
FIG. 3 illustrates another side view of the workstation of FIG. 1, according to an embodiment of the present subject matter.

FIG. 3 illustrates another side view of the workstation 100 of FIG. 1. As described herein, and in some examples, the height of the work surface 110 is adjustable. For example, the length of the leg 120A is adjustable along an axis 300. Varying the length of the leg 120A can vary the height of the work surface 110.

In some examples, the leg 120A can telescope. For instance, the leg 120A can include a first leg member 310, a second leg member 320, and a third leg member 330. The leg members 310, 320, 330 can be slidingly coupled with each other, and translation of the leg members 310, 320, 330 with respect to each other (e.g., translation of member 320 with respect to member 310) can vary the height of the leg 120A. The leg assembly 120 can be coupled to the frame 200, and the work surface 110 can be coupled to the frame 200. Accordingly, translation of the leg assembly 120 can vary the height of the work surface 110 (e.g., along the axis 300).

Figure 4:
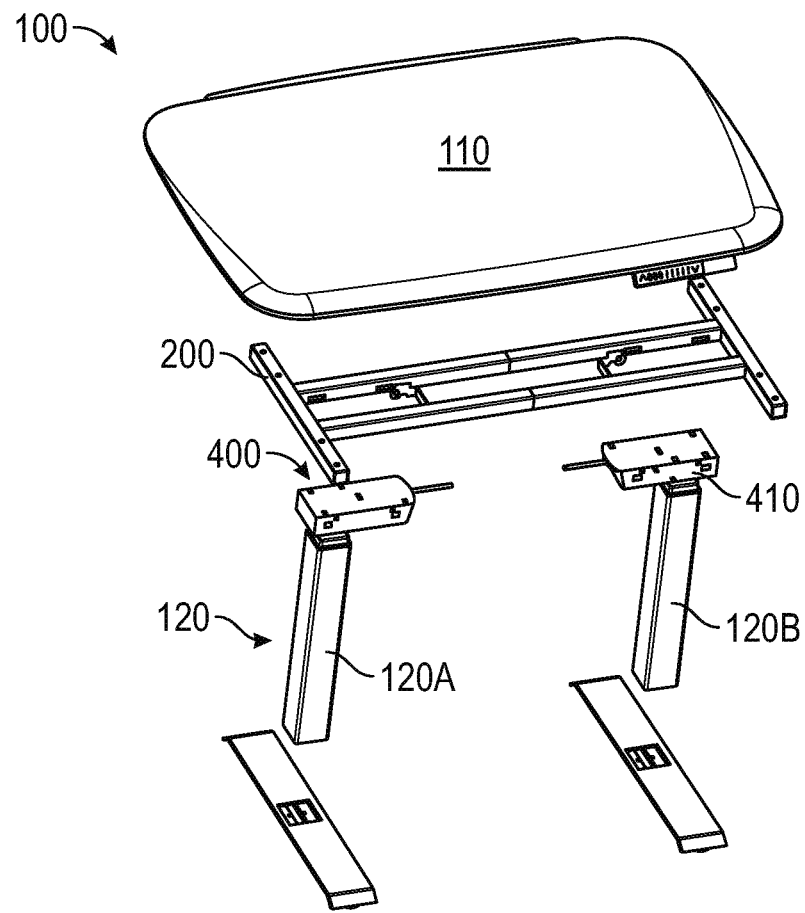
FIG. 4 illustrates an exploded view of the workstation of FIG. 1, according to an embodiment of the present subject matter.

FIG. 4 illustrates an exploded view of the workstation 100 of FIG. 1, As described herein, the height of the work surface 110 is adjustable. For example, the leg assembly 120 can include an actuator 400 that adjusts the length of the leg assembly 120 (and accordingly the height of the work surface 110). The actuator 400 can include an actuator housing 410, and the actuator housing 410 can be coupled to one or more of the legs 120A, 120B. Operation of the actuator 400 (e.g., by a user engaging with the control panel 140, shown in FIG. 1) can translate the leg members 310, 320, 330. Translation of the lea members 310, 320, 330 can vary the length of the legs 120A, 120B, and can adjust the height of work surface 110.

As described in greater detail herein, the leg assembly 120 can be selectively attached to, and selectively detached from, the frame 200. For example, the leg assembly 120 (e.g., the actuator housing 410) can include leg coupling features, and the frame 200 can include frame coupling features. The leg coupling features can engage with the frame coupling features, and the engagement of the leg coupling features with the frame coupling features attaches the leg assembly 120 (e.g., the legs 120A, 120B) to the frame 200.

Figure 5:
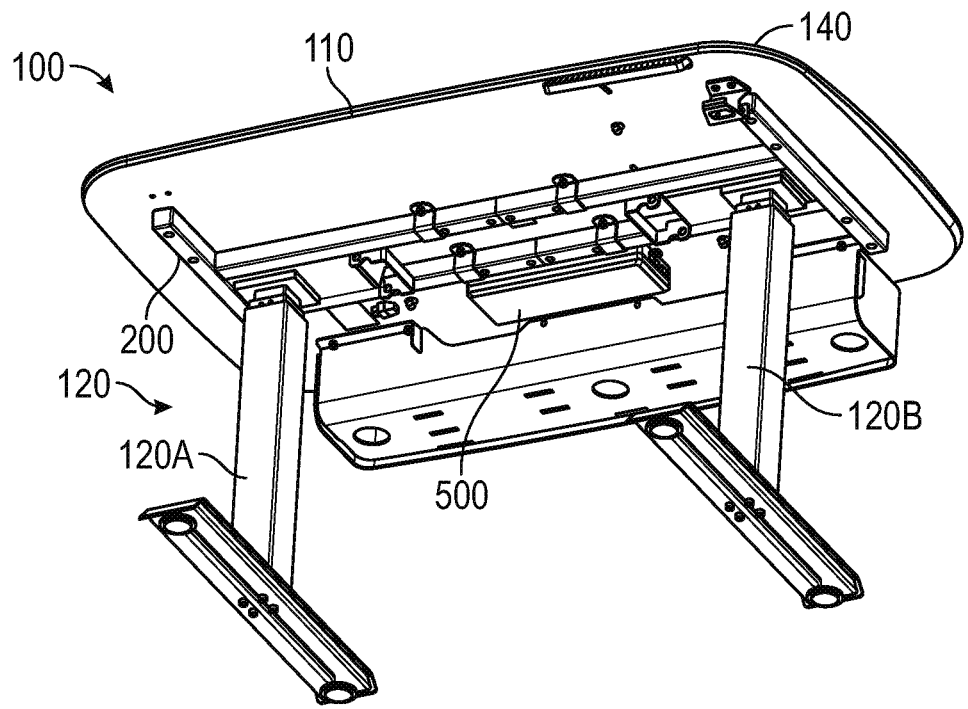
FIG. 5 illustrates another perspective view of the workstation of FIG. 1, according to an embodiment of the present subject matter.

FIG. 5 illustrates another perspective view of the workstation of FIG. 1. The workstation 100 can include a control circuit 500. The control circuit 500 can facilitate the operation of one or more functions of the workstation 100. For example, the control circuit 500 can be in communication with (e.g., with a wired connection, wireless connection, or the like) the control panel 140. Operation of the control panel 140 can transmit a signal (e.g., a change in current, voltage, resistance, or the like) to the control circuit 500, and the control panel 140 can operate one or more functions of the workstation 100. For instance, a user can interact with the control panel 140, such as by pressing a button to raise or lower the work surface 110. The control circuit 500 can communicate with the actuator 400, and the control circuit 500 can operate the actuator 400 to vary the length of the legs 120A, 120B.

Figure 6:
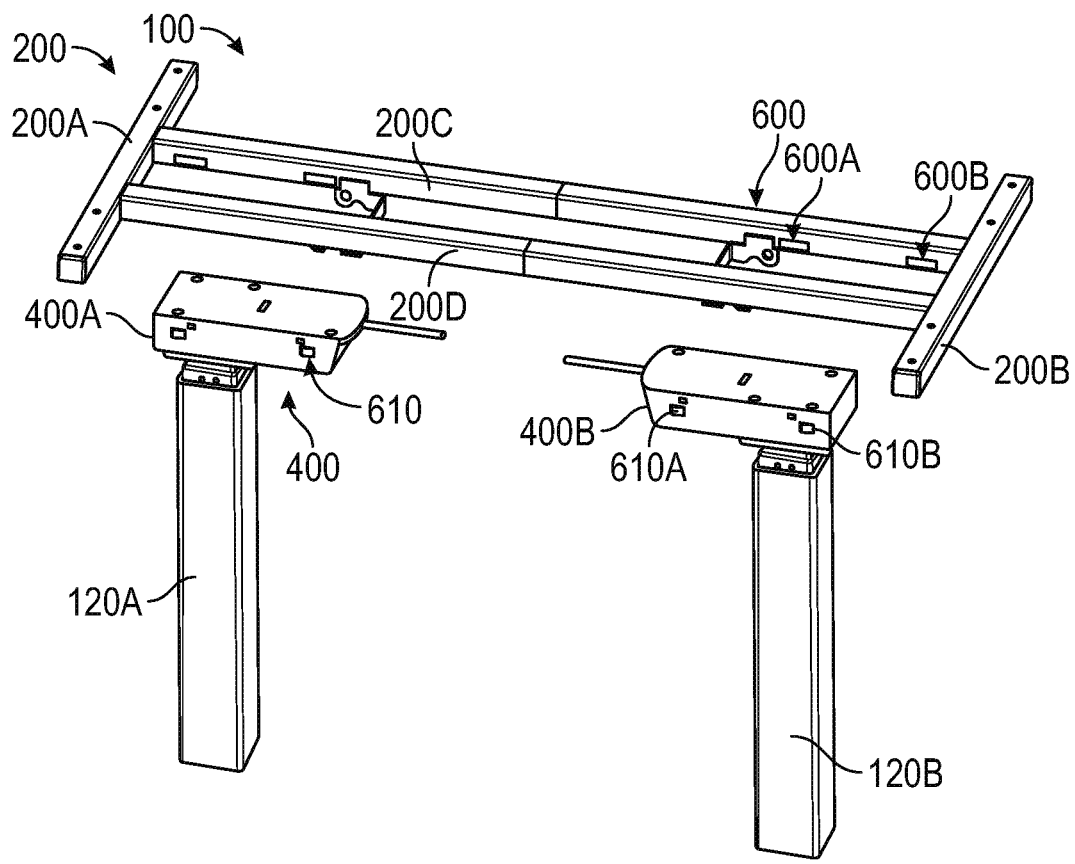
FIG. 6 illustrates another exploded view of the workstation of FIG. 1, according to an embodiment of the present subject matter.

FIG. 6 illustrates another exploded view of the workstation 100 of FIG. 1. As described herein, the leg assembly 120 can selectively attach to, and detach from, the frame 200. For example, the frame 200 can include one or more frame coupling features 600, for instance a first frame coupling feature 600A and a second frame coupling feature 600B. The frame coupling features 600 can have a frame feature profile 605 (e.g., shape, size, dimension, outline, perimeter, design, or the like).

In an example, the frame 200 includes a first frame member 200A, a second frame member 200B, a third frame member 200C, and a fourth frame member 2001). The frame members 200A, 200B, 200C, 200D can include the frame coupling features 600. For instance, the member 200C can define the frame coupling features 600. The features 600 can include, but are not limited to a boss, pin, ridge, protrusion, projection, detent, plug, key, channel, slot, hole, groove, keyway, socket, teeth, or a combination thereof. In the example shown in FIG. 6, the member 200C defines at least one channel (e.g., the channel 800, shown in FIG. 8).

The leg assembly 120 can include one or more leg coupling features 610, for instance a first leg coupling feature 610A and a second leg coupling feature 610B. The leg coupling features 610 can have a leg feature profile 615

(e.g., shape, size, dimension, outline, surface, perimeter, design, contour, or the like). In an example, the legs 120A, 120B define the leg coupling features 610. In another example, the actuator housing 410 defines the leg coupling features 610. In some examples, the legs 120A, 120B and the actuator housing 410 define the leg coupling features 610. The features 610 can include, but are not limited to a boss, pin, ridge, protrusion, projection, detent, plug, key, channel, slot, hole, groove, keyway, socket, teeth, or a combination thereof. In the example shown in FIG. 6, the actuator housing 410 defines at least one boss (e.g., the boss 700 shown in FIG. 7).

The leg feature profile 615 can be complementary to (e.g., correspond to, match, pair, mimic, fit, or the like) the frame feature profile 605. In an example, the frame coupling features 600 are sized and shaped to allow the leg coupling features 610 to engage (e.g., couple, receive, interlink, intermesh, lock, mate, or the like) with the frame coupling features 600. The engagement of the frame coupling features 600 with the leg coupling features 610 attaches the leg assembly 120 to the frame 200. In an example, the frame coupling features 600 include a channel, and the leg coupling features 610 include a boss. The channel can be sized and shaped to receive the boss. The boss can engage with the channel, and the engagement between the boss and the channel attaches the leg assembly 120 to the frame 200. The frame coupling features 600 can be disengaged from the leg coupling features 610, and the leg assembly 120 can be detached from the frame 200. Accordingly, the leg assembly 120 can be selectively attached to, and selectively detached from, the frame 200.

Figure 7:
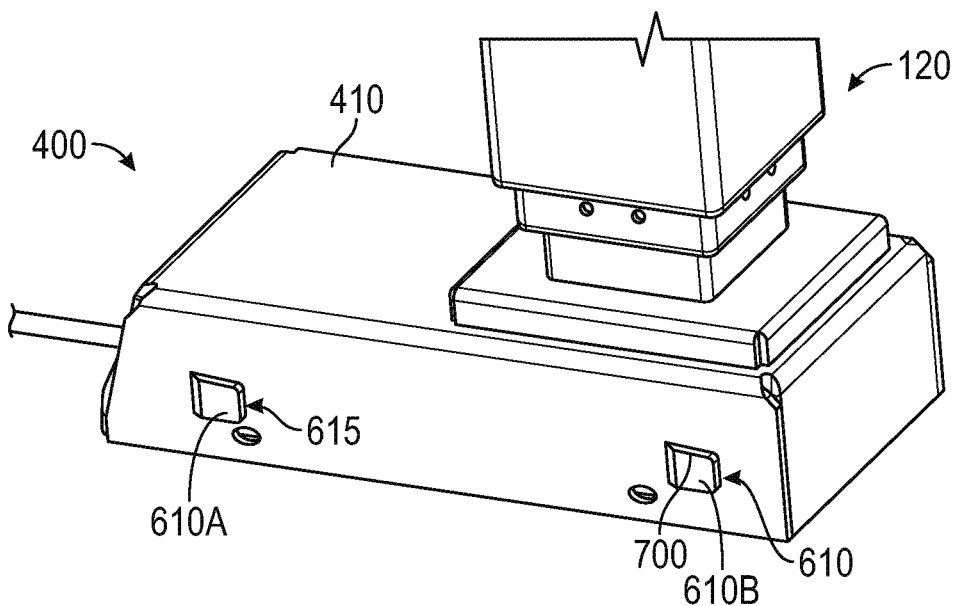
FIG. 7 illustrates a detailed view of an actuator housing, according to an embodiment of the present subject matter.

FIG. 7 illustrates a detailed view of the actuator housing 410. As described herein, the leg assembly 120 can include the leg coupling features 610. The leg coupling features 610 can include a boss 700. For example, the actuator housing 410 can define the boss 700, and the boss 700 can project from the actuator housing 410. The boss 700 can have the leg feature profile 615. For example, the leg feature profile 615 of the boss 700 can be generally rectangular.

Figure 8:
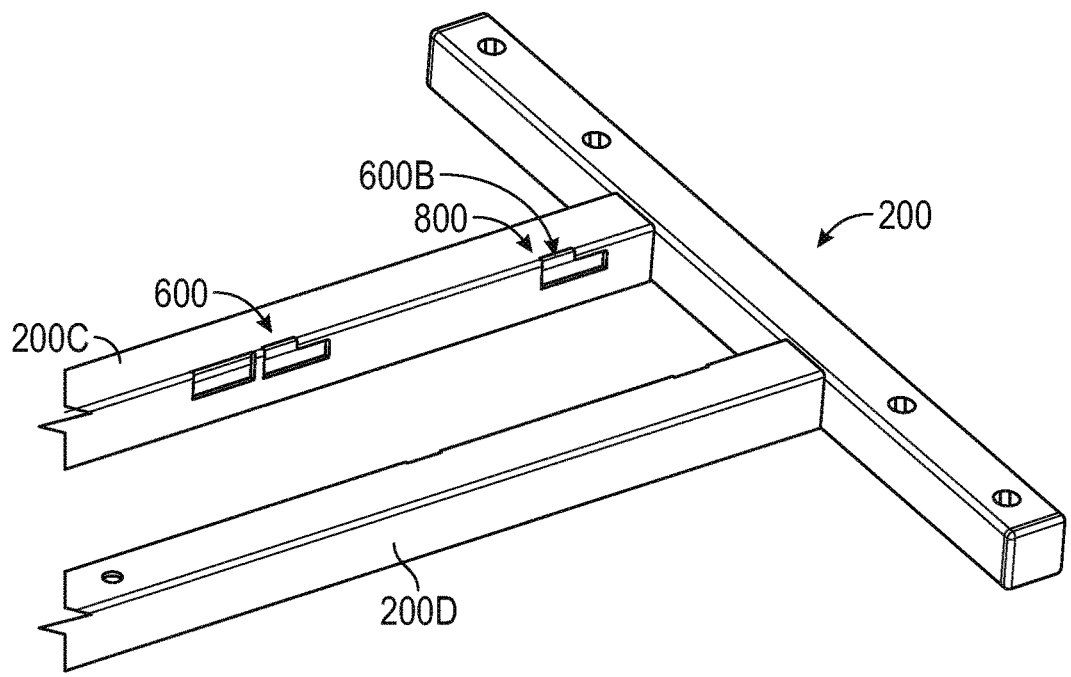
FIG. 8 illustrates a detailed view of a frame, according to an embodiment of the present subject matter.

FIG. 8 illustrates a detailed view of the frame 200. As described herein, the frame 200 can include the frame coupling features 600. The framed coupling features 600 can include a channel 800. In an example, the frame member 200C defines the channel 800. In an example, a portion of the frame member 200C may be removed (e.g., machined, for instance with a milling operation) to define the channel 800 in the frame member 200C. The channel 800 can have the frame feature profile 605. For example, the frame feature profile 605 of the channel 800 can be generally L-shaped.

Figure 9:
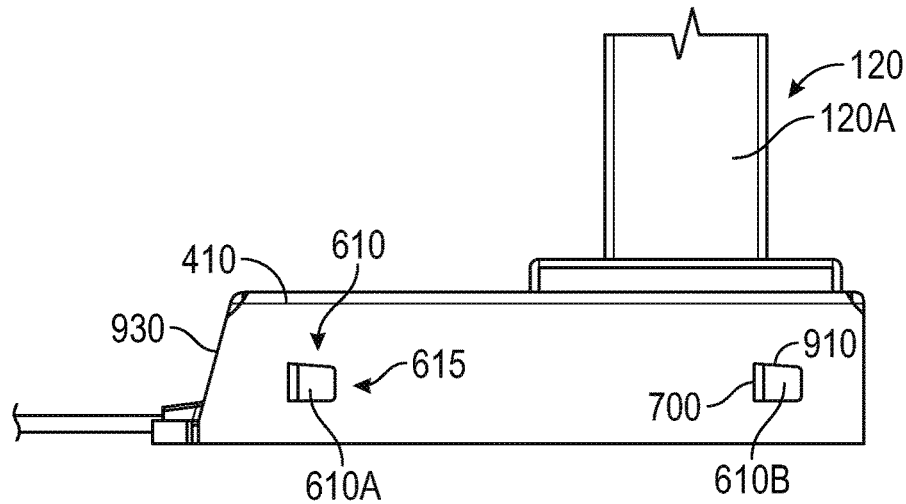
FIG. 9 illustrates a side view of the actuator housing and the frame, according to an embodiment of the present subject matter.
Figure 9:
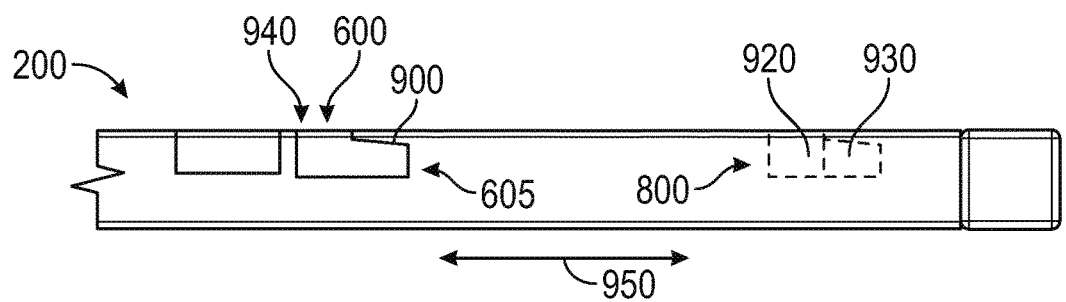

FIG. 9 illustrates a side view of the actuator housing 410 and the frame 200. FIG. 9 shows the leg assembly 120 detached from the frame 200. As described herein, the leg coupling features 610 can engage with the frame coupling features 600 to attach the leg assembly 120 to the frame 200. For example, the leg feature profile 615 can be complementary to the frame feature profile 605. Accordingly, the channel 800 can be sized and shaped to receive the boss 700. In some examples, the slot 800 includes a first inclined surface 900, and the boss 700 includes a second inclined surface 910. The inclined surface 900, 910 can engage in surface to surface contact. In some examples, the inclined surfaces 900, 910 can help facilitate alignment of the leg assembly 120 with respect to the frame 200.

In some examples, the channel 800 includes a first section 920 and a second section 930. The first section 920 can define an opening 940, and the opening 940 can be sized and shaped to receive the boss 800. The leg assembly 120 (e.g., the leg 120A) can translate with respect to the frame 200, for instance along axis 950. Accordingly, when the boss 800 is received in the first section 920 of the channel 800 and the leg assembly 120 is translated along the axis 950, the boss 700 can translate within the channel 800 between the first section 920 and the second section 930. The leg assembly 120 can be attached to the frame 200 when the boss 700 is located in the second section 930 of the channel 800. For example, the boss can be retained within the channel 800 when the boss is located in the second section 930 of the channel 800. The engagement between the inclined surfaces 900, 910 can inhibit the detachment of the leg assembly 120 from the frame 200, In some examples, the leg assembly 120 can be detachable from the frame 200 when the boss 700 is located in the first section 920 of the channel 800.

Figure 10:
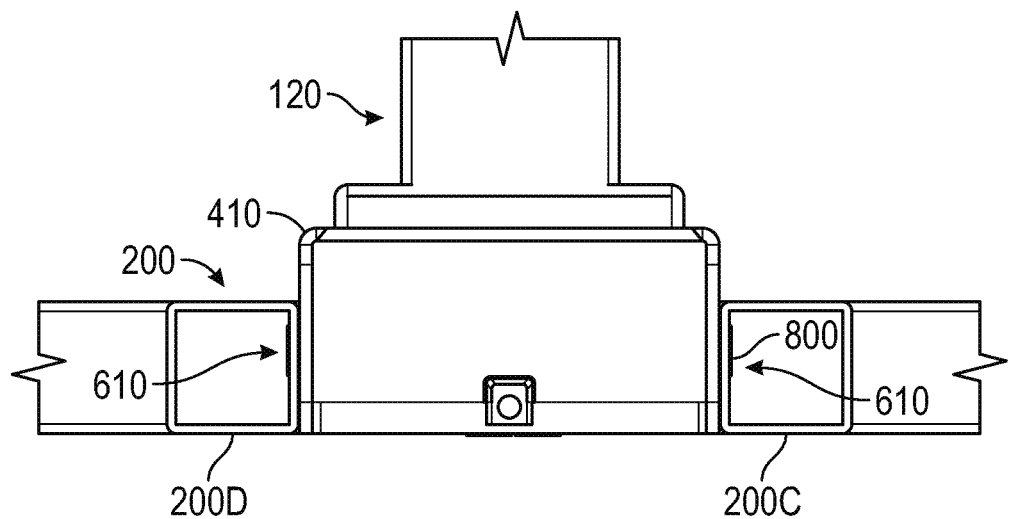
FIG. 10 illustrates another side view of the actuator housing and the frame, according to an embodiment of the present subject matter.

FIG. 10 illustrates another side view of the actuator housing 410 and the frame 200. FIG. 10 shows the leg assembly 120 attached to the frame 200. As described herein, the leg coupling features 610 can engage with the frame coupling features to attach the leg assembly 120 to the frame 200. For example, the leg coupling features 610 can be received by the frame coupling features 600. FIG. 10 shows the boss 700 received in the channel 800. For instance, the boss 800 can extend into the frame member 200C. The boss 800 can extend into the frame member 200D. The engagement of the boss 800 with the channel can attach the leg assembly 120 to the frame 200.

Figure 11:
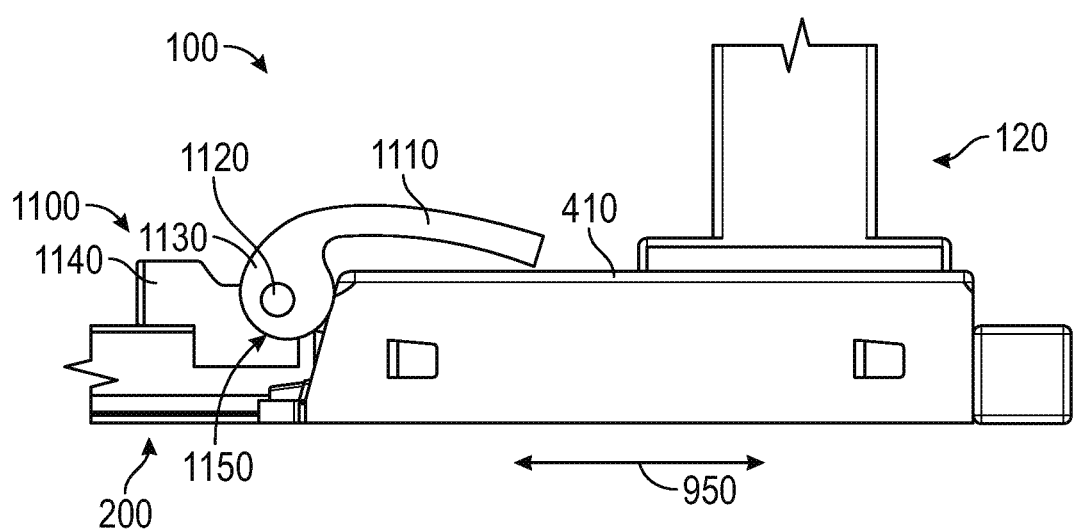
FIG. 11 illustrates yet another side view of the actuator housing and the frame, according to an embodiment of the present subject matter.

FIG. 11 illustrates yet another side view of the actuator housing 410 and the frame 200. The workstation 100 can include a latch 1100. The latch 1100 can secure the leg assembly 120 to the frame 200. For example, the latch 1100 can inhibit the translation of the leg assembly 120 with respect to the frame 200.

The latch 1100 can include a handle 1110, and the handle 1110 can facilitate operation of the latch (e.g., by a user). The latch 1100 can include a hinge 1120, a latch body 1130, and a latch bracket 1140. The hinge 1120 can be coupled to the frame, and the latch body 1130 can be moveably coupled to the hinge 1120. The latch body 1130 can define a cam surface 1150, and the cam surface 1150 can have an eccentric profile (e.g., an ellipse-shaped, variable radius, or the like). Movement of the latch body 1130 can engage the cam surface 1150 with the actuator housing 410. For example, the cam surface 1150 can be disengaged from the actuator housing 410 when the handle 1110 is in a first configuration. The cam surface 1150 can be engaged with the actuator housing 410 when the handle 1110 is in a second configuration. The engagement of the cam surface 1150 with the actuator housing 410 can inhibit translation of the leg assembly 120 with respect to the frame 200, for instance along the axis 950.

Figure 12:
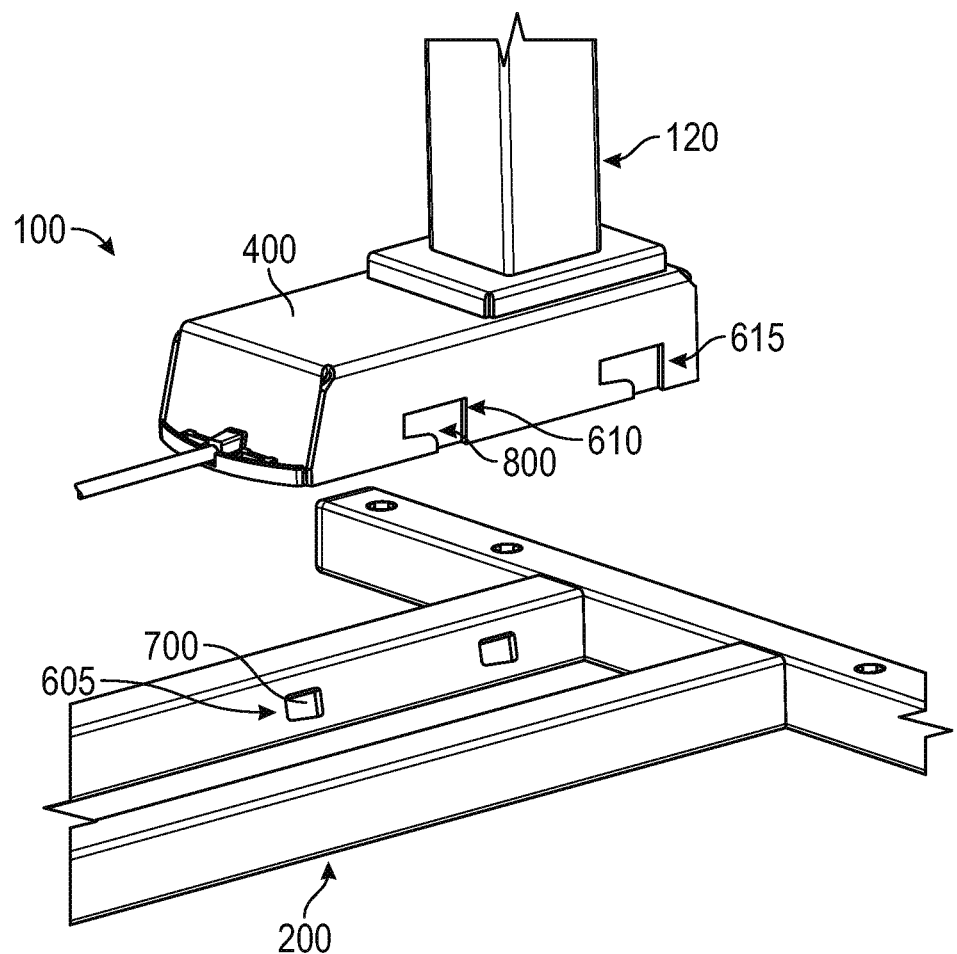
FIG. 12 illustrates a perspective view of a second example of the workstation, according to an embodiment of the present subject matter.
Figure 13:
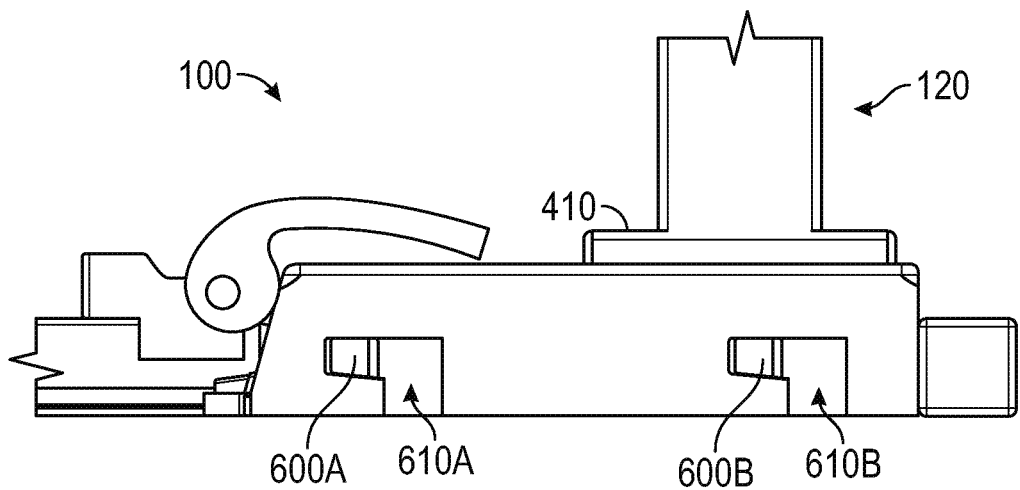
FIG. 13 illustrates a side view of the workstation of FIG. 12, according to an embodiment of the present subject matter.

FIG. 12-13 illustrates a perspective view and a side view of a second example of the workstation 100, according to an embodiment of the present subject matter. As described herein, the frame 200 can include the frame coupling features 600, and the leg assembly 120 (e.g., the actuator housing 410) can include the leg coupling features 610. The frame feature profile 605 and the leg feature profile 615 can be variable (e.g., the coupling features 600, 610 can have a plurality of configurations, combinations, iterations, or the like). For example, FIG. 9 shows the frame coupling features 600 includes the channel 800, and the leg coupling features 610 includes the boss 700. FIG. 12 shows the frame coupling features 600 include the boss 700, and the leg coupling features 610 include the channel 800.

In some examples, the frame coupling features 600 include the boss 700 and the channel 800, and the leg coupling features 610 include the boss 700 and the channel 800. The boss 700 of the frame 200 can engage with the channel 800 of the leg assembly 120. The boss 700 of the leg assembly 120 can engage with the channel 800 of the frame 200. Accordingly, the frame coupling features 600 can include a mixture of frame feature profiles 605 (e.g., a boss and a channel), and the leg coupling feature 610 can include a mixture of leg feature profiles 615.

Figure 14:
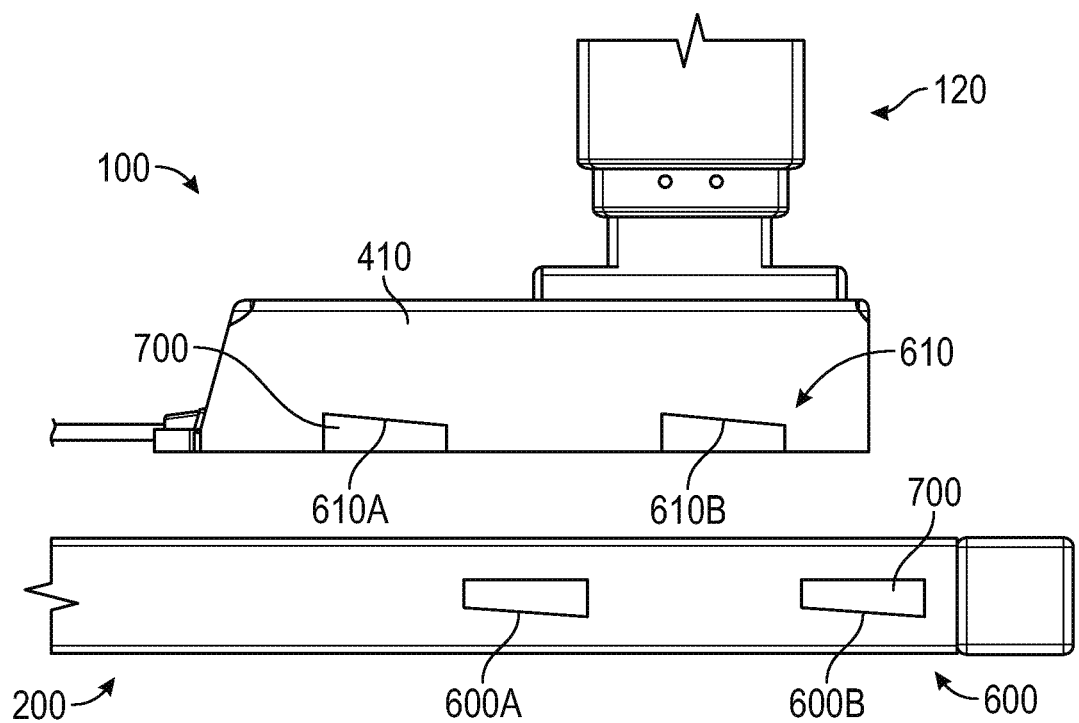
FIG. 14 illustrates a side view of a third example of the workstation, according to an embodiment of the present subject matter.
Figure 15:
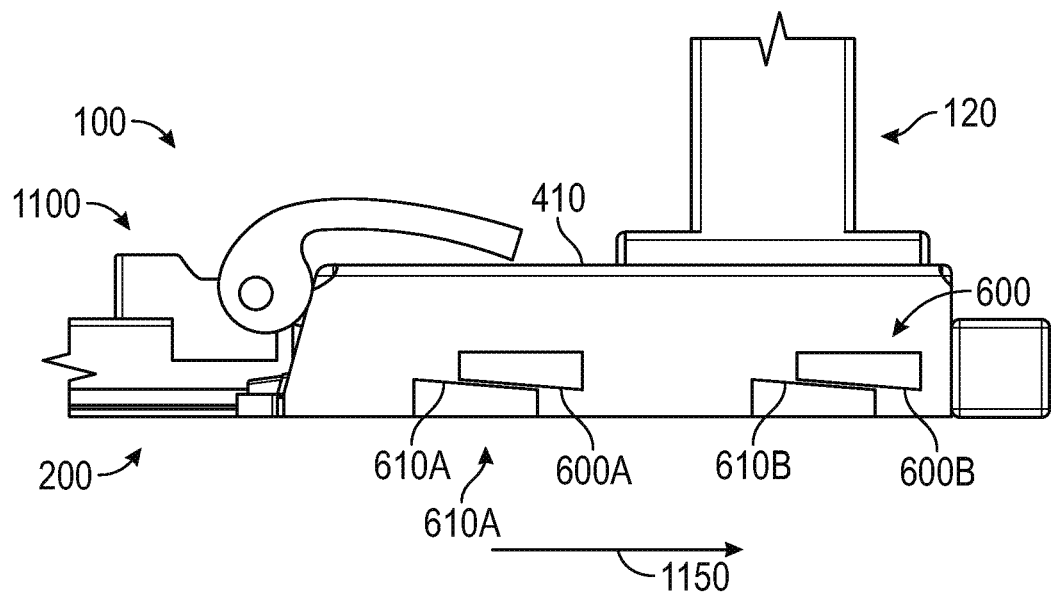
FIG. 15 illustrates another side view of the workstation of FIG. 14.

FIG. 14-15 illustrates side views of a third example of the workstation lull, according to an embodiment of the present subject matter. As described herein, the frame feature profile 605 and the leg feature profile 615 can be variable. For example, the frame coupling features 600 can include the boss 700, and the leg coupling features 610 can include the boss 700. The frame coupling features 600 can include the inclined surface 900, and the leg coupling features 610 can include the inclined surface 910. The inclined surface 900 can engage in surface to surface contact with the inclined surface 910. The engagement between the inclined surfaces 900, 910 can attach the leg assembly 120 to the frame 200. For example, the engagement of the inclined surfaces 900, 910 can bias (e.g., press, push, drive, clamp, or the like) the leg assembly 120 toward a portion of the frame 200 (or toward the work surface 110, shown in FIG. 1). The engagement between the coupling features 600, 610 can provide an interference fit of the leg coupling features 610 between the frame coupling features 600 and a different portion of the frame 200 (or the work surface 110, shown in FIG. 1). The biasing force generated between the coupling features 600, 610 can increase when the leg assembly 120 is translated in the direction of arrow 1500. The biasing force generated between the coupling features 600, 610 can decrease when the leg assembly is translated in a direction opposite to the direction of the arrow 1500.

In some examples, the coupling feature 610B can be received between the coupling features 600A, 600B (e.g., when the leg assembly 120 is located proximate to the frame 200). The leg assembly 120 can be translated with respect to the frame 200 to engage the coupling features 600, 610. For example, the inclined surface 910 of the coupling feature 610B can engage with the inclined surface 900 of the coupling feature 600B. The inclined surface 910 of the coupling feature 610A can engage with the inclined surface 900 of the coupling feature 600A. The coupling features 600, 610 can engage with each other to attach the leg assembly 120 to the frame 200.

Figure 16:
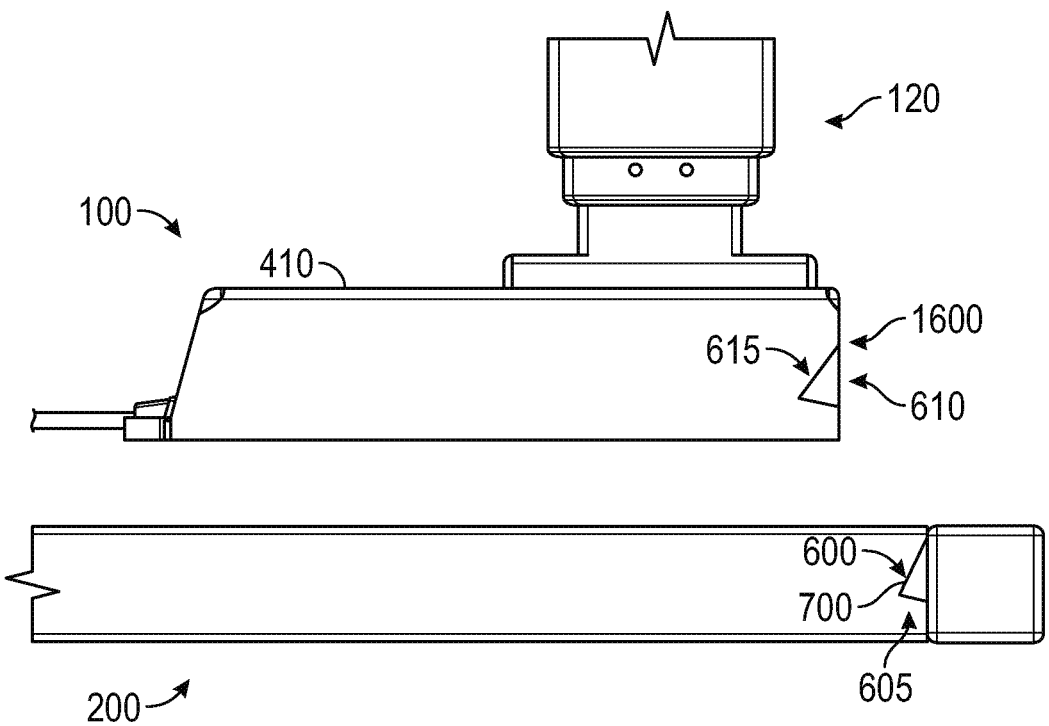
FIG. 16 illustrates a side view of a fourth example of the workstation, according to an embodiment of the present subject matter.
Figure 17:
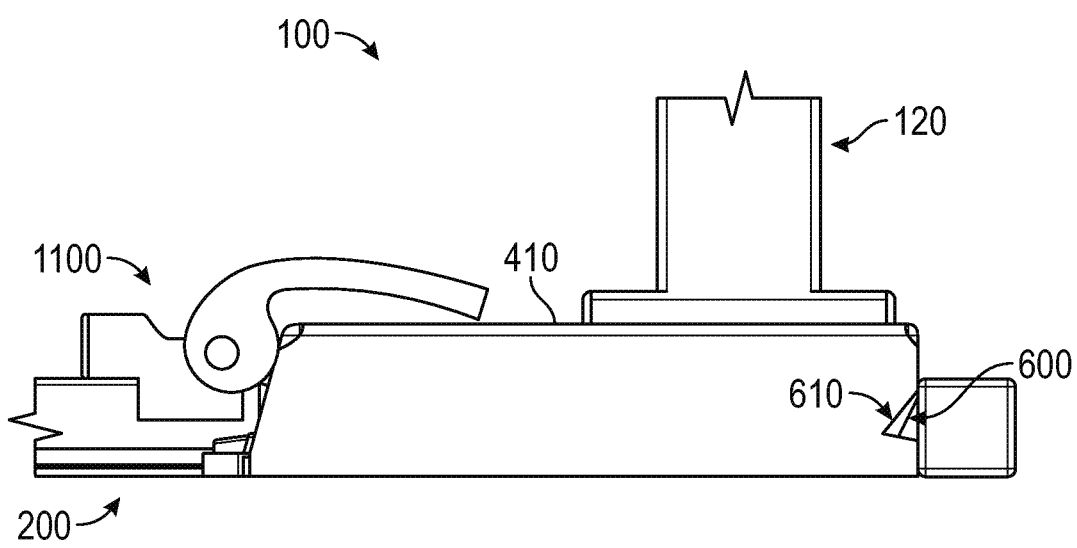
FIG. 17 illustrates another side view of the workstation of FIG. 16.
Figure 18:
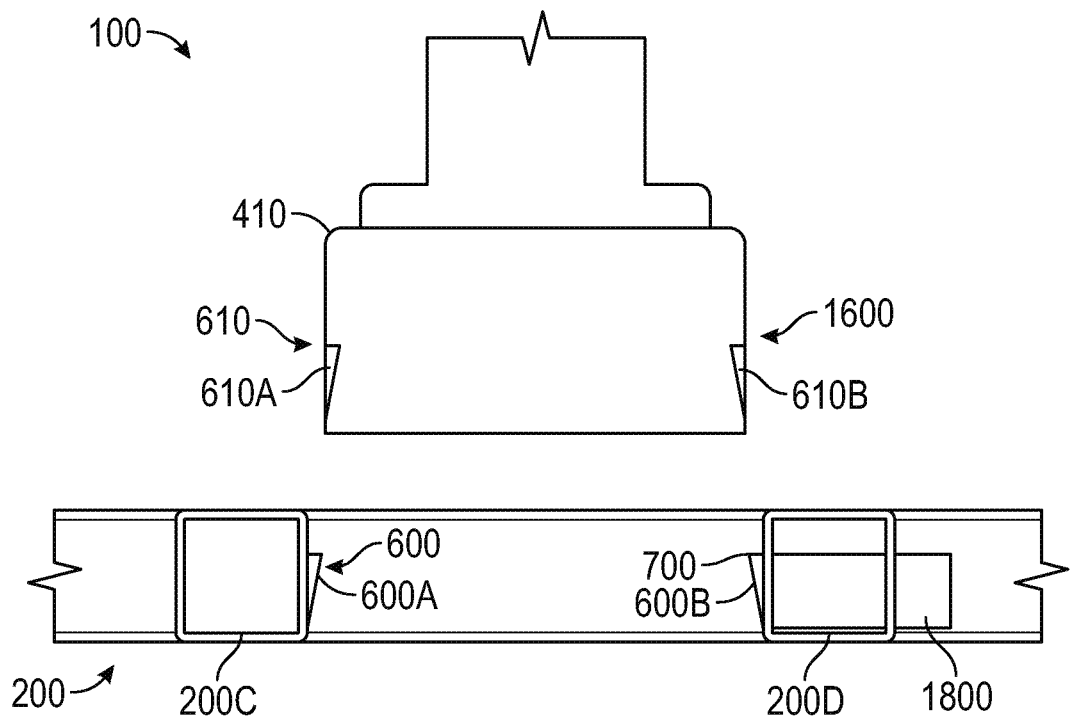
FIG. 18 illustrates a side view of a fifth example of the workstation, according to an embodiment of the present subject matter.
Figure 19:
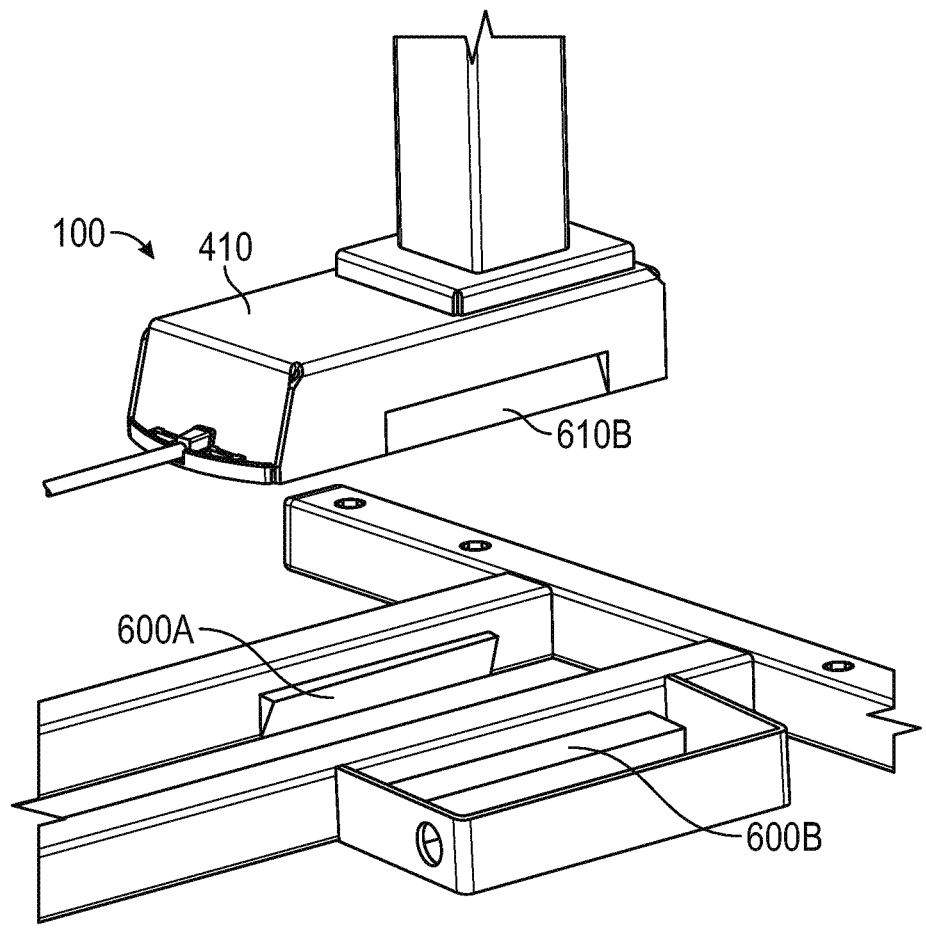
FIG. 19 illustrates a perspective view of the workstation of FIG. 18, according to an embodiment of the present subject matter.

FIGS. 16-17 illustrate side views of a fourth example of the workstation 100, according to an embodiment of the present subject matter. The frame coupling features 600 can include the boss 700. The leg coupling features 610 can include a socket 1600. The socket 1600 can be configured to receive the boss 700. The boss 700 can engage with the socket 1600. The engagement between the boss 700 and the socket 1600 can attach the leg assembly 120 to the frame 120. In some examples, the frame feature profile 605 and the leg feature profile 615 can be generally triangle-shaped. The feature profiles 605, 615 can be complementary, for instance to allow the socket 1600 to receive the boss 700.

FIG. 18-21 illustrate side views and a perspective view of a fifth example of the workstation 100, according to an embodiment of the present subject matter. As described herein, the latch 1100 can secure the leg assembly 120 to the frame 200. In some examples, the latch 1100 can include the frame coupling features 600. For example, the latch 1100 can include a bolt 1800, and the bolt 1800 can define the frame coupling features 600. For instance, the bolt 1800 can define the boss 700. The bolt 1800 can be moveably coupled to the frame 200. For instance, the bolt 1800 can extend through the frame member 200D, and the bolt 1800 can translate to (e.g., displace, slide, reciprocate, cycle, move, oscillate, or the like) with respect the frame 200. The frame 200 can include the boss 700. The boss 700 can be stationary (e.g., fixed, fastened, or the like) with respect to the frame 200.

As described herein, the bolt 1800 can be moveable with respect to the frame 200. For example, the bolt 1800 can include a retracted configuration where the bolt 1800 is disengaged from the socket 1600 (e.g., the bolt 1800 is at least partially retracted into the frame 200). The bolt 1800 can include an extended configuration where the bolt 1800 is configured to engage with the socket 1600 (e.g., the bolt 1800 projects from the frame member 200D)

The leg assembly 120 (e.g., the actuator housing 120) can be located between the frame members 2000, 200D and the frame coupling features 600 can engage with the leg coupling features 610 to attach the leg assembly 120 to the frame. For example, the actuator housing 410 can define the sockets 1600, and the sockets 1600 can receive the boss 700 and the bolt 1800. The boss 700 and the bolt 1800 can engage with the sockets 1600 to attach the leg assembly 120 to the frame 200.

Figure 20:
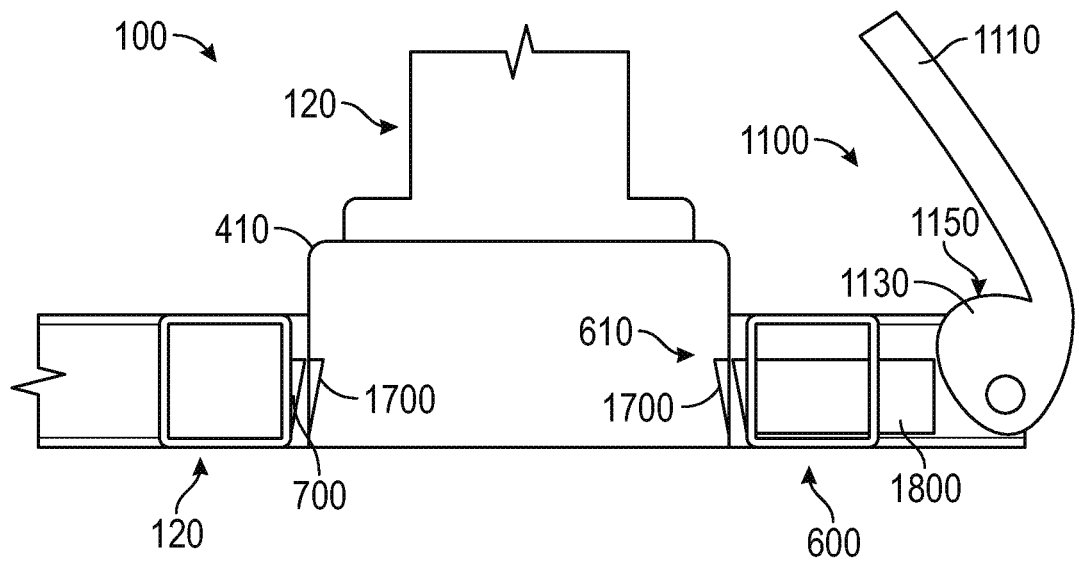
FIG. 20 illustrates another side view of the workstation of FIG. 18, according to an embodiment of the present subject matter.
Figure 21:
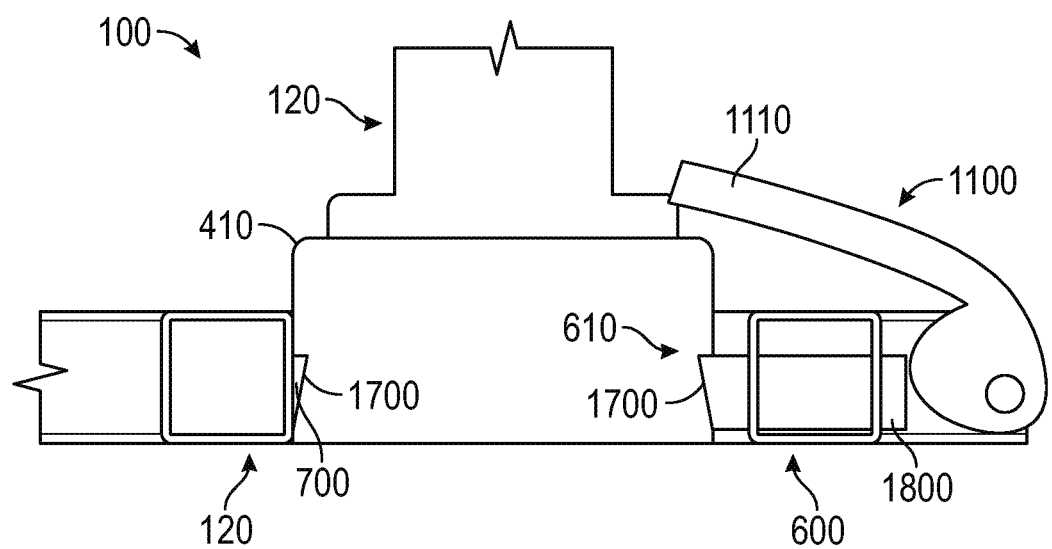
FIG. 21 illustrates yet another side view of the workstation of FIG. 18, according to an embodiment of the present subject matter.

FIG. 20 shows the latch 1100 in a first configuration with the frame coupling features 600 disengaged from the leg coupling features 610. For instance, the cam surface 1150 of the latch body 1130 can be disengaged from the bolt 1800. Accordingly, the bolt 1800 can be disengaged from the actuator housing 410. FIG. 21 shows the latch 1100 in a second configuration with the frame coupling features 600 engaged with the leg coupling features 610. For example, the handle 1110 can be manipulated (e.g., rotated) to change latch 1100 between the first configuration and the second configuration. In the second configuration, the cam surface 1150 can be engaged with the bolt 1800. Manipulation of the handle 1110 can translate the bolt 1800 with respect to the frame 200 because the eccentric profile of the latch body 1130 can cause a translation of the bolt 200 when the cam surface 1150 is engaged with the bolt 200. The bolt 200 can engage with the actuator housing 410, and the engagement of the bolt 200 with the actuator housing 410 can secure the leg assembly 120 to the frame 200. For instance, the engagement of the bolt 200 with socket 1600 can bias the leg assembly 120 toward the boss 700. Accordingly, the latch 1100 can secure the leg assembly 120 to the frame 200.

Figure 22:
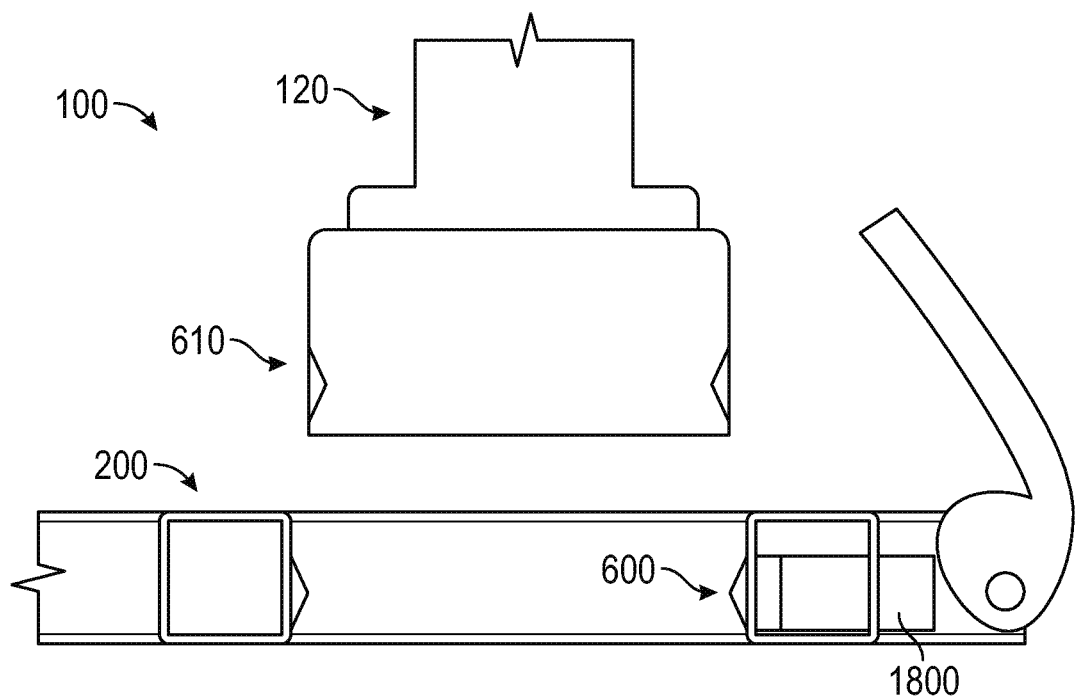
FIG. 22 illustrates a side view of a sixth example of the workstation, according to an embodiment of the present subject matter.

FIG. 22 illustrates a side view of a sixth example of the workstation 100, according to an embodiment of the present subject matter. As described herein, the frame feature profile 605 and the leg feature profile 615 of the coupling features 600, 610 can be variable. For example, the bolt 1800 shown in FIGS. 18-21 has a single facet. FIG. 22 shows the bolt 1800 can be multi-faceted. The bolt 1800 can engage with the leg assembly 120 to secure the leg assembly 120 to the frame 200. For example, the socket 1600 can be multi-faceted and the bolt 1800 can engage with the socket 1600 to secure the leg assembly 120 to the frame 200.

Figure 23:
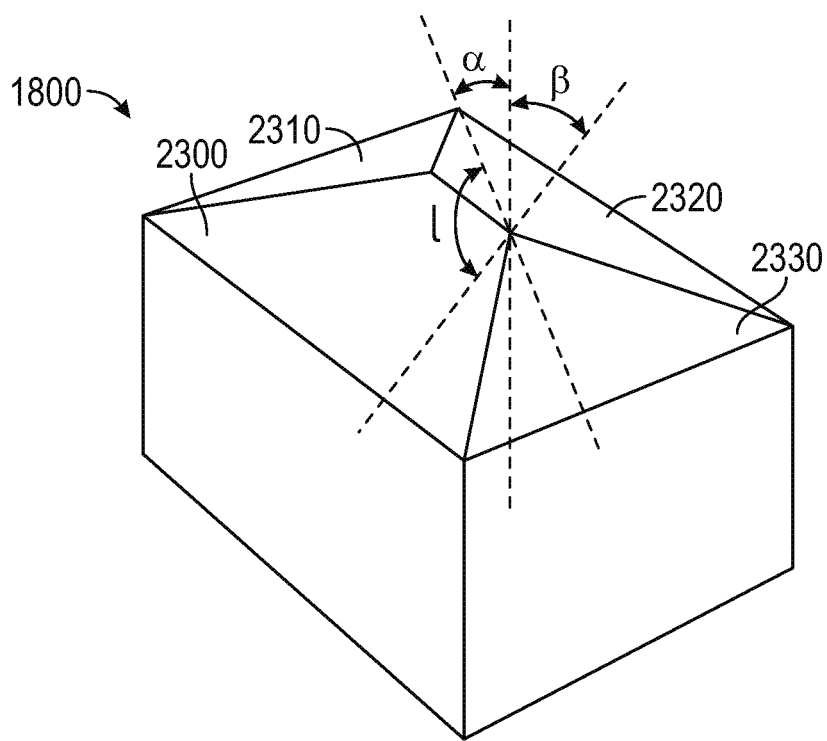
FIG. 23 illustrates a perspective view of a bolt, according to an embodiment of the present subject matter.

FIG. 23 illustrates a perspective view of the bolt 1800. As described herein, coupling features 600, 610 can include the bolt 1800, and the bolt 1800 can be multi-faceted. For example, the bolt 1800 can include a first face 2300, a second face 2310, a third face 2320, and a fourth face 2330. The faces 2300, 2310, 2320, 2330 can engage with the leg assembly 120 (shown in FIG. 22). For instance, the faces 2300, 2310, 2320, 2330 can engage with the socket 1600 (shown in FIG. 16).

Figure 24:
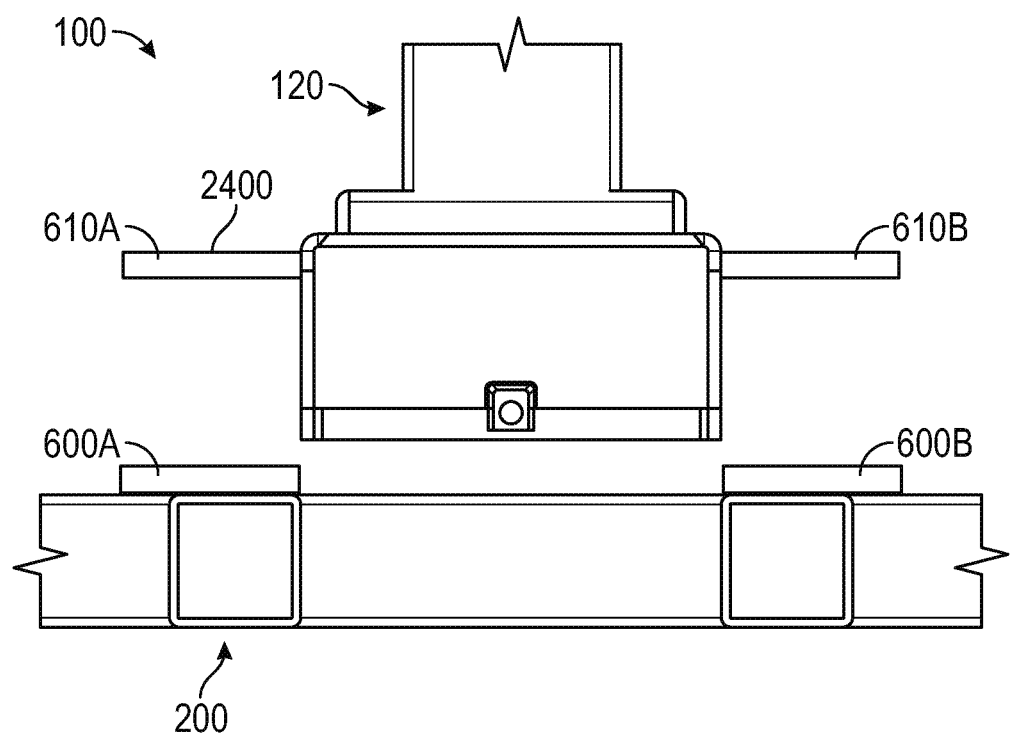
FIG. 24 illustrates a side view of a seventh example of the workstation, according to an embodiment of the present subject matter.
Figure 25:
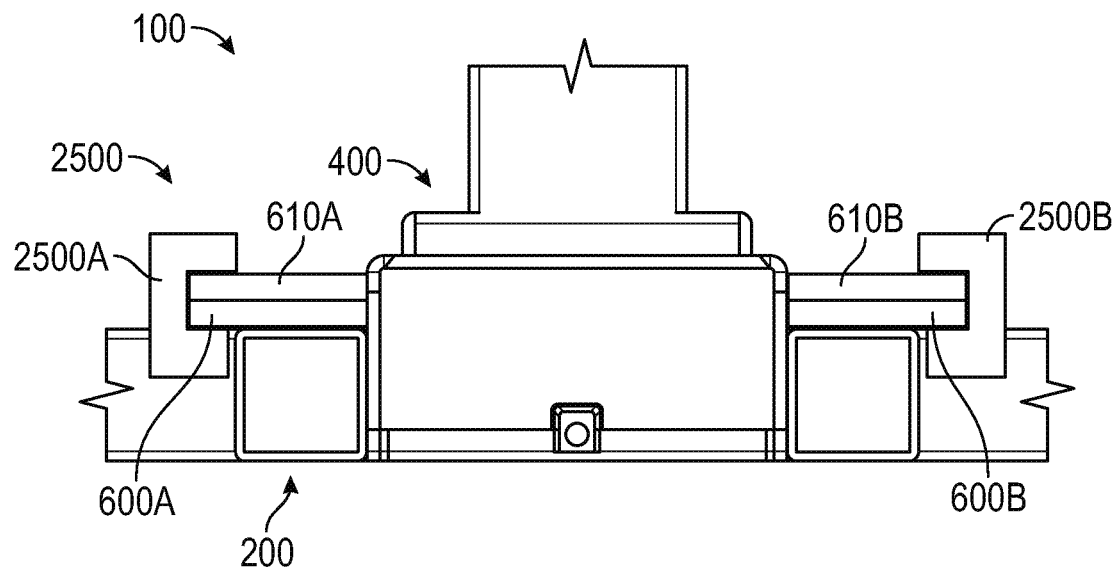
FIG. 25 illustrates another side view of the workstation of FIG. 24, according to an embodiment of the present subject matter.

FIGS. 24-25 illustrates a side view of a seventh example of the workstation 100, according to an embodiment of the present subject matter. The frame coupling features 600 can include a flange 2400. For example, the first frame coupling feature 600A and the second frame coupling feature 600B can include the flange 2400. The leg coupling features 610 can include the flange 2400. For instance, the first leg coupling feature 610A and the second leg coupling feature 610B can include the flange 2400. The flanges 2400 of the frame coupling features 600 can engage with the flanges 2400 of the leg coupling features 610 to attach the leg assembly 120 to the frame. For example, the leg assembly 120 can be located proximate to the frame 200. The latch 1100 can include one or more clamps 2500A, 2500B. The clamps 2500A, 2500B can engage with (e.g., compress, press, squeeze, or the like) the flanges 2400 of the coupling features 600, 610 to secure the leg assembly 120 to the frame 200.

Figure 26:
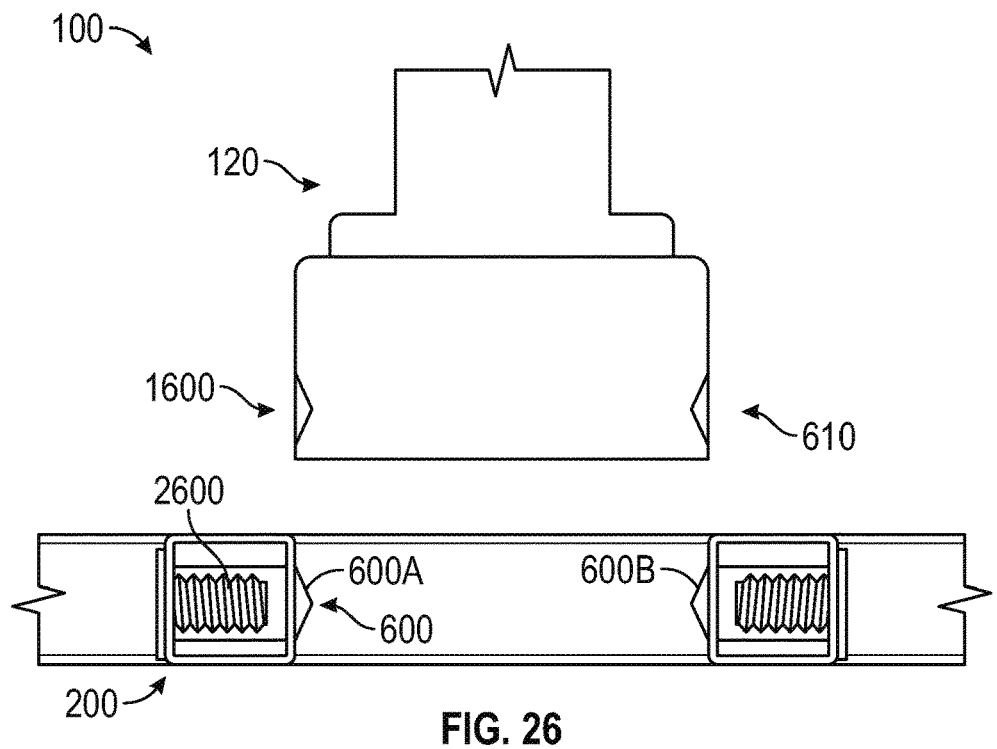
FIG. 26 illustrates a side view of an eighth example of the workstation, according to an embodiment of the present subject matter.

FIG. 26 illustrates a side view of an eighth example of the workstation 100, according to an embodiment of the present subject matter. As described herein, the bolt 1800 can include the frame coupling features 600 (e.g., the first and second frame coupling features 600A, 600B), The workstation 100 can include a biasing member 2600 (e.g., a spring, or the like), and the biasing member 2600 can bias the coupling members 600, 610 toward engagement. For example, the biasing member 2600 can be located between the bolt and the frame 200. The biasing member 2600 can engage with the bolt 1800 to bias the bolt 1800 toward engagement with the socket 1600. The biasing member 2600 can bias the bolt 2600 (or the boss 700, shown in FIG. 18) toward the extended configuration.

Figure 27:
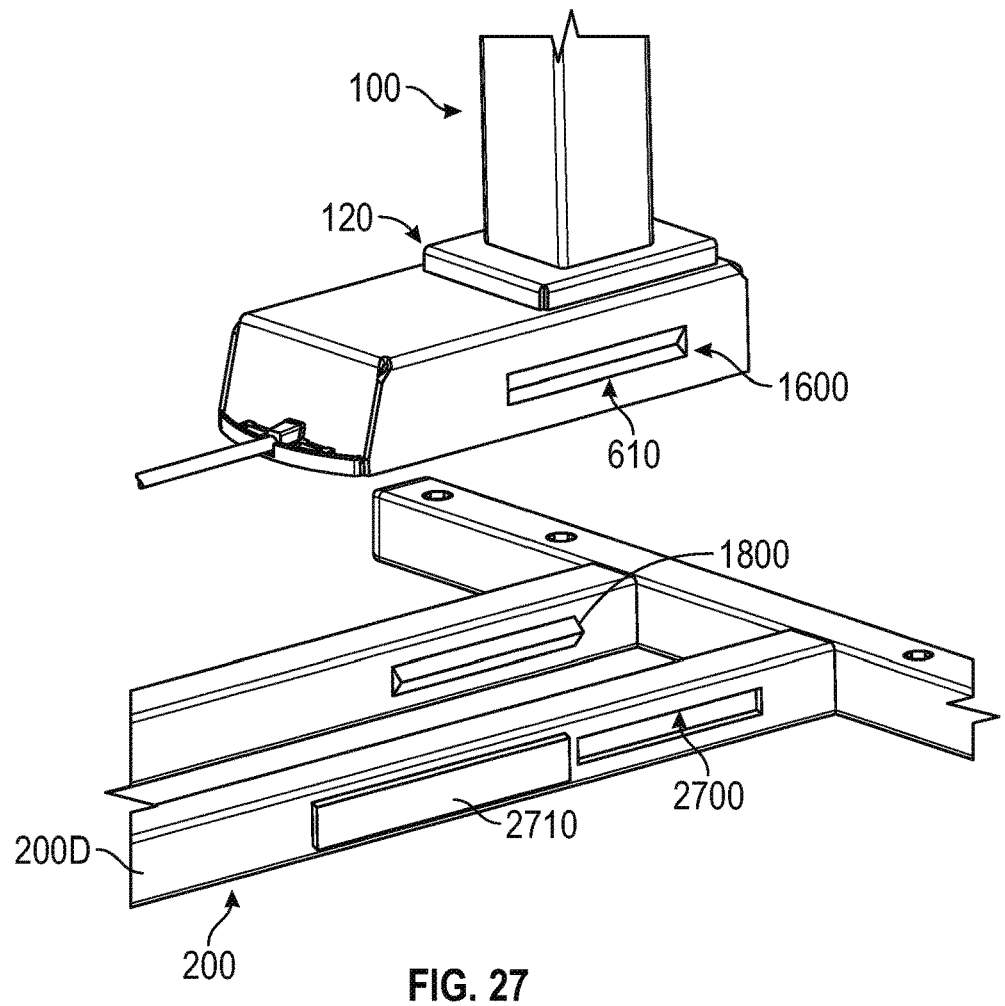
FIG. 27 illustrates a perspective view of a ninth example of the workstation, according to an embodiment of the present subject matter.
Figure 28:
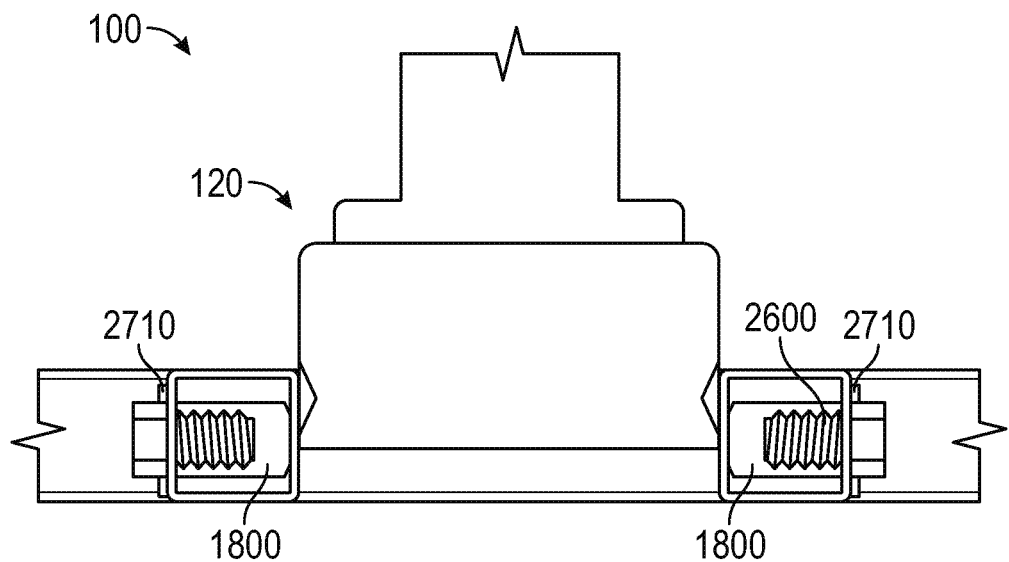
FIG. 28 illustrates a side view of the workstation of FIG. 27, according to an embodiment of the present subject matter.

FIG. 27-28 illustrate a perspective view and a side view of a ninth example of the workstation 100, according to an embodiment of the present subject matter. As described herein, the workstation 100 can include the block 1800 and the biasing member 2600. The bolt 1800 can be moveably coupled to the frame 200. For example, the bolt 1800 can extend through a through-hole 2700 defined by the frame 200 (e.g., the frame member 200D), A block 2710 (e.g., clip, clamp, or the like) can secure the leg assembly 120 to the frame 200. For example, the bock 2710 can engage with the bolt 1800 and inhibit the translation of the bolt 1800 with respect to the frame 200. For example, the block 2710 can inhibit the disengagement of the bolt 1800 from the socket 1600. Accordingly, the block 1800 can secure the leg assembly 120 to the frame 200. In an example, the block 2710 can engage with the bolt 1800 at one or more locations. For example, the block 2710 can engage with the bolt 1800 to secure (e.g., maintain, lock, stop, hold, or the like) the bolt 1800 in a position where the bolt 1800 is disengaged with the socket 1600. The block 2710 can engage with the bolt 1800 to secure the bolt in a position where the bolt 1800 is engaged with the socket 1600.

Figure 29:
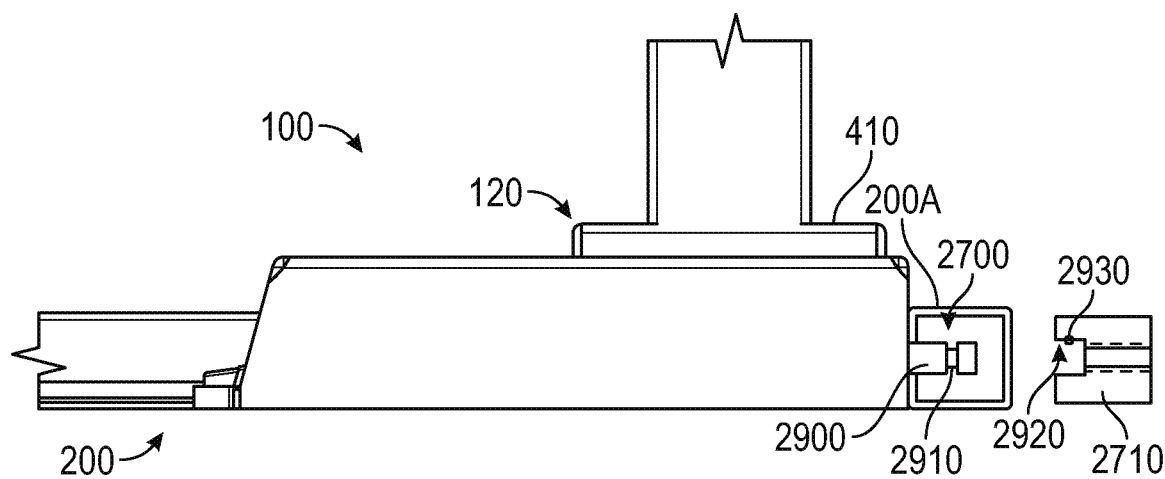
FIG. 29 illustrates a side view of a tenth example of the workstation, according to an embodiment of the present subject matter.

FIG. 29 illustrates a side view of a tenth example of the workstation 100, according to an embodiment of the present subject matter. As described herein, the frame 200 (e.g., the frame member 200A) can define the through hole 2700. The frame coupling features 600 can include the through-hole 2700. The leg coupling features 610 can include a pin 2900. For instance, the pin 2900 can extend from the actuator housing 410. The through-hole 2700 can receive the pin 2900, and the engagement of the pin 2900 and the through-hole 2700 of the frame 200 can attach the leg assembly 120 to the frame 200.

The block 2710 can secure the leg assembly 120 to the frame 200. For example, the frame member 200A can receive the block 2710. In an example, the block 2710 is sized and shaped for insertion into the frame member 200A. The pin 2900 can define the groove 2910. The block 2710 can define a pin socket 2920, and the pin socket 2720 can receive the pin 2900. The block 2710 can include a locking ridge 2930, and the locking ridge 2930 can be included in the coupling features 600, 610. For example, the locking ridge 2930 can engage with the groove 2910, for instance when the block 2710 is inserted into the frame member 200A, The engagement of the pin 2900 with the pin socket 2920 of the block 2710 can inhibit the disengagement of the pin 2900 from the frame 200. For instance, the engagement of the locking ridge 2930 with the groove 2910 can inhibit the translation of the pin 2900 with respect to the frame 200. Accordingly, the block 2710 can secure the leg assembly 120 to the frame 200.

As described herein, the frame coupling features 600 can include a mixture of frame feature profiles 605, and the leg coupling feature 610 can include a mixture of leg feature profiles 615 (shown in FIG. 6). Accordingly, one or more features, components, coupling features 600, 610, or the like shown or described herein can be combined in various permutations, combinations, or the like. For example, the inclined surfaces 900, 910 shown and described with reference to FIGS. 14-15 can be used in combination with the bolt 1800 (or the latch 1100) shown and described with reference to FIGS. 18-21.

Additional Notes and Aspects

Aspect 1 may include or use subject matter such as an apparatus, a system, a device, a method, a means for performing acts, or a device readable medium including instructions that, when performed by the device, may cause the device to perform acts), such as may include or use a workstation including a height-adjustable work surface, comprising: a frame configured to couple with the height adjustable work surface and including a frame coupling feature, wherein the frame coupling feature includes a frame feature profile; a leg assembly configured to selectively attach to and detach from the frame, including: an adjustable-length leg configured to support the frame; a housing coupled to the leg; a leg coupling feature defined by the housing, wherein the leg coupling features has a leg feature profile complementary to the frame feature profile, and the leg coupling feature is configured to engage with the frame coupling feature to attach the leg to the frame; and a latch configured to engage with the leg assembly, wherein engagement of the latch with the leg assembly secures a position of the leg with respect to the frame.

Aspect 2 may include or use, or may optionally be combined with the subject matter of Aspect 1, to optionally include or use wherein the housing includes an actuator, wherein the actuator is configured to adjust the length of the leg.

Aspect 3 may include or use, or may optionally be combined with the subject matter of Aspect 1, to optionally include or use wherein frame coupling feature is configured to slidably engage with the leg coupling feature.

Aspect 4 may include or use, or may optionally be combined with the subject matter of Aspect 1, to optionally include or use wherein: the frame coupling feature includes a channel; the leg coupling feature includes a boss; the channel is configured to receive the boss; and the reception of the boss by the channel engages the leg coupling feature with the frame coupling feature to attach the leg to the frame.

Aspect 5 may include or use, or may optionally be combined with the subject matter of Aspect 1, to optionally include or use wherein: the frame coupling feature includes a boss; the leg coupling feature includes a channel; the channel is configured to receive the boss; and the reception of the boss by the channel engages the frame coupling feature with the leg coupling feature to attach the leg to the frame.

Aspect 6 may include or use, or may optionally be combined with the subject matter of Aspect 5, to optionally include or use wherein: the channel includes a first section and a second section; wherein the latch secures the boss within the second section of the channel, the leg is detachable from the frame when the boss is located in the first section of the channel; and the leg is attached to the frame when the boss is located in the second section of the channel.

Aspect 7 may include or use, or may optionally be combined with the subject matter of Aspect 5, to optionally include or use wherein the latch secures the boss within the second section of the channel.

Aspect 8 may include or use, or may optionally be combined with the subject matter of Aspect 5, to optionally include or use wherein the boss is moveable between an extended configuration and a retracted configuration with respect to the frame, wherein: in the extended configuration, the boss is configured to extend into the first channel; and in the retracted configuration, the boss is configured to disengage from the channel, and the leg is allowed to detach from the frame.

Aspect 9 may include or use, or may optionally be combined with the subject matter of Aspect 8, to optionally include or use wherein the boss is included in a bolt moveably coupled to the frame, wherein the bolt is configured to translate with respect to the frame and selectively engage with the housing.

Aspect 10 may include or use, or may optionally be combined with the subject matter of Aspect 8, to optionally include or use further comprising a biasing member that biases the boss into the extended configuration with respect to the frame.

Aspect 11 may include or use, or may optionally be combined with the subject matter of Aspect 10, to optionally include or use wherein leg assembly includes a block configured to inhibit the translation of the bolt with respect to the frame.

Aspect 12 may include or use, or may optionally be combined with the subject matter of Aspect 5, to optionally include or use wherein the boss is multi-faceted, and the channel is multi-faceted to complement the multi-faceted boss.

Aspect 13 may include or use, or may optionally be combined with the subject matter of Aspect 1, to optionally include or use wherein: the frame coupling feature includes a first inclined surface; the leg coupling feature includes a second inclined surface; the first inclined surface is configured to engage with the second inclined surface; and the first inclined surface is configured to be located between the first inclined surface and one or more of a different portion of the frame and the work surface, and locating the first inclined surface between the second inclined surface and one or more of the different portion of the frame and the work surface attaches the leg to the frame.

Aspect 14 may include or use, or may optionally be combined with the subject matter of Aspect 13, to optionally include or use wherein the second inclined surface is configured for an interference fit between the first inclined surface and one or more of a different portion of the frame and the work surface.

Aspect 15 may include or use, or may optionally be combined with the subject matter of Aspect 1, to optionally include or use wherein: the frame coupling feature includes a first boss having a first inclined surface and a second boss having a second inclined surface; the leg coupling feature includes a third boss having a third inclined surface and a fourth boss having a fourth inclined surface; the first inclined surface is configured to engage with the third inclined surface; the second inclined surface is configured to engaged with the fourth inclined surface; the first boss and the second boss are sized and shaped to receive the fourth boss between the first boss and the second boss; and the leg is configured to translate with respect to the frame; and translation of the leg with respect to the frame selectively engages the first inclined surface with the third inclined surface and the second inclined surface with the fourth inclined surface.

Aspect 16 may include or use, or may optionally be combined with the subject matter of Aspect 1, to optionally include or use wherein the latch includes a cam having an eccentric profile, wherein: the latch body is rotatably coupled to the frame; and the latch body defines a cam surface that is configured to engage with a portion of the housing to secure the position of the leg with respect to the frame.

Aspect 17 may include or use, or may optionally be combined with the subject matter of Aspect 16, to optionally include or use wherein the cam is rotatable between a locked configuration and an unlocked configuration, wherein: in the locked configuration, the cam surface is engaged with the surface of the housing; and in the unlocked configuration, the cam surface is disengaged from the surface of the housing.

Aspect 18 may include or use, or may optionally be combined with the subject matter of Aspect 1, to optionally include or use wherein the latch includes: a bolt moveably coupled to the frame, wherein the bolt is configured to translate with respect to the frame and selectively engage with the housing; and a cam surface defined by the latch body and having an eccentric profile, wherein the cam surface is configured to engage with the latch body.

Aspect 19 may include or use subject matter (such as an apparatus, a system, a device, a method, a means for performing acts, or a device readable medium including instructions that, when performed by the device, may cause the device to perform acts), such as may include or use a workstation including a height-adjustable work surface, comprising: a frame coupled to the height adjustable work surface and including a plurality of frame coupling features, wherein the frame coupling features include a frame feature profile; a leg assembly configured to selectively attach to and detach from the frame, including: a first adjustable-length leg configured to support the frame; a first actuator including a first actuator housing coupled to the first adjustable-length leg, wherein the first actuator is configured adjust the length of the first adjustable-length leg; a first leg coupling feature defined by the first actuator housing, wherein the leg coupling feature has a leg feature profile complementary to the frame feature profile, and the leg coupling feature is engaged with one or more of the frame coupling features to attach the first adjustable-length leg to the frame; and a first latch configured to engage with the first adjustable-length leg to secure a position of the first adjustable-length leg with respect to the frame.

Aspect 20 may include or use, or may optionally be combined with the subject matter of Aspect 19, to optionally include or use wherein the leg assembly includes: a second adjustable-length leg configured to support the frame; a second actuator including a second actuator housing coupled to the second adjustable-length leg, wherein the second actuator is configured to adjust the length of the second adjustable-length leg; a second leg coupling feature defined by the second actuator housing, wherein the second leg coupling feature has the leg feature profile and is engage with one or more of the frame coupling features to attach the second adjustable-length leg to the frame; and a second latch configured to engage with the second adjustable-length leg and secure a position of the second adjustable-length leg with respect to the frame.

Aspect 2.1 may include or use, or may optionally be combined with the subject matter of Aspect 19, to optionally include or use further comprising a first foot configured to attach to the first adjustable-length leg.

Aspect 22 may include or use, or may optionally be combined with the subject matter of Aspect 19, to optionally include or use wherein: the first leg coupling feature includes a first flange; the frame coupling features include a second flange; and the first flange is configured to engage with the second flange.

Aspect 23 may include or use, or may optionally be combined with the subject matter of Aspect 22, to optionally include or use wherein the first latch clamps the first flange and the second flange together to attach the first adjustable-length leg to the frame.

Aspect 24 may include or use, or may optionally be combined with the subject matter of Aspect 19, to optionally include or use wherein: the first leg coupling feature includes a pin that defines a groove; the frame coupling features include a through-hole configured to receive the pin; and the leg assembly includes a block that defines a pin socket configured to receive the pin, wherein: a locking ridge is located in the pin socket; the groove defined by the pin is configured to receive the locking ridge; and the lock block is sized and shaped for insertion into the frame when the pin is located in the through hole, wherein the lock block engages with the pin and the frame to inhibit the translation of the pin with respect to the frame.

Aspect 25 may include or use, or may optionally be combined with any portion or combination of any portions of any one or more of Aspects 1 through 24 to include or use, subject matter that may include means for performing any one or more of the functions of Aspects 1 through 20.

Each of these non-limiting aspects can stand on its own, or can be combined in any permutation or combination with any one or more of the other aspects.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The claimed invention is:

1. A workstation including a height-adjustable work surface, comprising:
    a frame configured to couple with the height-adjustable work surface and including a frame coupling feature, wherein the frame coupling feature includes a frame feature profile having a first inclined surface; and
    a leg assembly configured to selectively attach to and detach from the frame, the leg assembly including:
    an adjustable-length leg configured to support the frame;
    a housing coupled to the leg; and
    a leg coupling feature defined by the housing, wherein:
    the leg coupling feature includes a leg feature profile having a second inclined surface;
    the leg feature profile is complementary to the frame feature profile; and
    the second inclined surface is configured to selectively engage with the first inclined surface to inhibit displacement of the leg relative to the frame and bias the leg assembly toward one or more of the frame or the height-adjustable work surface.

2. The workstation of claim 1, wherein frame coupling feature is configured to slidably engage with the leg coupling feature.

3. The workstation of claim 1, further comprising:
    a latch configured to engage with the leg assembly, wherein engagement of the latch with the leg assembly secures the first inclined surface with the second inclined surface and attaches the leg assembly to the frame.

4. The workstation of claim 1, wherein:
the frame coupling feature comprises a boss having the first inclined surface;
the leg coupling feature comprises a socket having the second inclined surface;
the socket is configured to receive the boss; and
the first inclined surface engages the second inclined surface in correspondence with the boss received in the socket.

5. The workstation of claim 1, wherein:
the leg coupling feature is located between the frame coupling feature and the work surface in correspondence with engagement between the first inclined surface and the second inclined surface; and
engagement of the first inclined surface with the second inclined surface biases the leg assembly toward the work surface.

6. The workstation of claim 5, wherein the leg coupling feature is configured for an interference fit between the frame coupling feature and the work surface.

7. The workstation of claim 1, wherein:
the frame coupling feature comprises a first boss having the first inclined surface;
the leg coupling feature comprises a second boss having the second inclined surface;
the frame coupling feature comprises a third boss having a third inclined surface;
the leg coupling feature comprises a fourth boss having a fourth inclined surface; and
wherein the third inclined surface is configured to engage the fourth inclined surface.

8. The workstation of claim 7, wherein:
the first boss is spaced from the third boss;
the first boss and the third boss are sized and shaped to receive the fourth boss therebetween; and
the fourth boss is received between the first boss and the third boss in correspondence with the first inclined surface disengaged from the second inclined surface.

9. The workstation of claim 1, wherein the housing includes an actuator, and the actuator is configured to adjust the length of the leg.

10. The workstation of claim 1, wherein:
the frame includes:
a first end member;
a second end member; and
one or more transverse members extending between the first end member and the second end member; and
the one or more transverse members include the frame coupling feature.

11. The workstation of claim 1, wherein:
the frame includes:
a first end member;
a second end member; and
one or more transverse members extending between the first end member and the second end member; and
one or more of the first end member or the second end member include the frame coupling feature.

12. A workstation including a height-adjustable work surface, comprising:
a frame configured to couple with the height adjustable work surface and including a frame coupling feature, wherein the frame coupling feature includes a frame feature profile having a first inclined surface; and
a leg assembly configured to selectively attach to and detach from the frame, the leg assembly including:
an adjustable-length leg configured to support the frame;
a housing coupled to the leg; and
a leg coupling feature defined by the housing, wherein:
the leg coupling feature includes a leg feature profile having a second inclined surface;
the leg feature profile is complementary to the frame feature profile, and
the second inclined surface is configured to selectively engage with the first inclined surface to inhibit displacement of the leg relative to the frame; and
wherein:
the frame coupling feature comprises a boss having the first inclined surface and the leg coupling feature comprises a socket having the second inclined surface; or
the frame coupling feature comprises a socket having the first inclined surface and the leg coupling feature comprises a boss having the second inclined surface.

13. The workstation of claim 12, wherein frame coupling feature is configured to slidably engage with the leg coupling feature.

14. The workstation of claim 13, wherein the slidable engagement between the frame coupling feature and the leg coupling feature correspondingly biases the leg assembly toward one or more of the frame or the work surface.

15. The workstation of claim 12, further comprising:
a latch configured to engage with the leg assembly, wherein engagement of the latch with the leg assembly secures the first inclined surface with the second inclined surface and attaches the leg assembly to the frame.

16. The workstation of claim 12, wherein:
the leg coupling feature is located between the frame coupling feature and the work surface in correspondence with engagement between the first inclined surface and the second inclined surface; and
the first inclined surface is configured to cooperate with the second inclined surface to bias the leg assembly toward the work surface in correspondence with the boss received in the socket.

17. The workstation of claim 12, wherein:
the frame includes:
a first end member;
a second end member; and
one or more transverse members extending between the first end member and the second end member; and
one or more of the first end member or the second end member include the frame coupling feature.

18. A workstation including a height-adjustable work surface, comprising:
a frame configured to couple with the height adjustable work surface and including a frame coupling feature, wherein the frame coupling feature comprises a boss having a first inclined surface; and
a leg assembly configured to selectively attach to and detach from the frame, the leg assembly including:
an adjustable-length leg configured to support the frame;
a housing coupled to the leg; and
a leg coupling feature defined by the housing, wherein:
the leg coupling feature comprises a second boss having a second inclined surface; and
the second inclined surface is configured to selectively engage with the first inclined surface to inhibit displacement of the leg relative to the frame.

19. The workstation of claim 18, wherein frame coupling feature is configured to slidably engage with the leg coupling feature.

20. The workstation of claim 19, wherein the slidable engagement between the frame coupling feature and the leg coupling feature correspondingly biases the leg assembly toward one or more of the frame or the work surface.

21. The workstation of claim 18, wherein the leg coupling feature is configured for an interference fit between the frame coupling feature and one or more of a different portion of the frame or the work surface.

22. The workstation of claim 18, wherein:
the leg coupling feature is located between the frame coupling feature and the work surface in correspondence with engagement between the first inclined surface and the second inclined surface; and
the first inclined surface is configured to cooperate with the second inclined surface to bias the leg assembly toward the work surface in correspondence with the engagement between the first inclined surface and the second inclined surface.

23. The workstation of claim 18, wherein:
the frame includes:
a first end member;
a second end member; and
one or more transverse members extending between the first end member and the second end member; and
the one or more transverse members include the frame coupling feature.

* * * * *